(12) United States Patent
Higuchi et al.

(10) Patent No.: US 8,472,394 B2
(45) Date of Patent: Jun. 25, 2013

(54) BASE STATION, COMMUNICATION TERMINAL, TRANSMISSION METHOD AND RECEPTION METHOD

(75) Inventors: Kenichi Higuchi, Saitama (JP);
Mamoru Sawahashi, Yokohama (JP);
Nobuhiko Miki, Yokohama (JP);
Yoshihisa Kiskiyama, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 49 days.

(21) Appl. No.: 13/243,292

(22) Filed: Sep. 23, 2011

(65) Prior Publication Data
US 2012/0020321 A1 Jan. 26, 2012

Related U.S. Application Data

(63) Continuation of application No. 12/161,429, filed as application No. PCT/JP2007/050262 on Jan. 11, 2007, now Pat. No. 8,072,931.

(30) Foreign Application Priority Data

Jan. 18, 2006 (JP) ................. 2006-010496
May 1, 2006 (JP) ................. 2006-127987
Oct. 3, 2006 (JP) ................. 2006-272347
Nov. 1, 2006 (JP) ................. 2006-298312

(51) Int. Cl.
*H04W 4/00* (2009.01)

(52) U.S. Cl.
USPC ........................................ 370/329

(58) Field of Classification Search
None
See application file for complete search history.

(56) References Cited

U.S. PATENT DOCUMENTS

| 6,947,748 | B2 | 9/2005 | Li et al. | |
|---|---|---|---|---|
| 8,072,931 | B2 * | 12/2011 | Higuchi et al. | ............. 370/329 |
| 8,331,216 | B2 | 12/2012 | Palanki et al. | |
| 2004/0203476 | A1 | 10/2004 | Liu | |
| 2004/0266446 | A1 | 12/2004 | Nguyen et al. | |
| 2005/0220002 | A1 | 10/2005 | Li et al. | |
| 2006/0171295 | A1 | 8/2006 | Ihm et al. | |
| 2007/0097908 | A1 | 5/2007 | Khandekar et al. | |
| 2007/0097927 | A1 | 5/2007 | Gorokhov et al. | |

(Continued)

FOREIGN PATENT DOCUMENTS

| CN | 1484906 A | 3/2004 |
|---|---|---|
| EP | 1551115 A1 | 7/2005 |

(Continued)

OTHER PUBLICATIONS

International Search Report (English & Japanese) for PCT/JP2007/050262 mailed Feb. 6, 2007 (7 pages).

(Continued)

*Primary Examiner* — Anh-Vu Ly
(74) *Attorney, Agent, or Firm* — Osha Liang LLP

(57) ABSTRACT

A base station includes: means configured to manage frequency blocks; means configured to determine, for each frequency block, scheduling information for assigning one or more resource blocks to a communication terminal being in a good channel state; means configured to generate a control channel including the scheduling information for each frequency block; and means configured to frequency multiplexing control channels within the system frequency band and to transmit it. In addition, the base station transmits the control channel by separating a non-specific control channel to be decoded by a non-specific communication terminal and a specific control channel to be decoded by a communication terminal to which one or more resource blocks are assigned.

14 Claims, 36 Drawing Sheets

U.S. PATENT DOCUMENTS

| | | |
|---|---|---|
| 2008/0219363 A1 | 9/2008 | Li et al. |
| 2009/0028109 A1 | 1/2009 | Huang et al. |
| 2010/0103901 A1 | 4/2010 | Miki et al. |
| 2012/0008584 A1* | 1/2012 | Higuchi et al. ............... 370/329 |

FOREIGN PATENT DOCUMENTS

| | | |
|---|---|---|
| EP | 1724948 A1 | 11/2006 |
| EP | 1 887 723 A1 | 2/2008 |
| JP | 2004-135305 A | 4/2004 |
| WO | 01/76098 A2 | 10/2001 |
| WO | 2004-032375 | 4/2004 |
| WO | 2004091126 A1 | 10/2004 |
| WO | 2005020489 A1 | 3/2005 |
| WO | 2006-137495 | 12/2006 |

OTHER PUBLICATIONS

Written Opinion of International Searching Authority (Japanese only) for PCT/JP2007/050262 mailed Feb. 6, 2007 (3 pages).

Peter S. Chow, John M. Cioffi and John A.C. Bingham, "A Practical Discrete Multitone Transceiver Loading Algorithm for Data Transmission over Spectrally Shaped Channels", IEEE Transactions Communications, vol. 43, No. 2/3/4, Feb./Mar./Apr. 1995 (2 pages).

Office Action issued in related Russian Patent Application No. 2008133315; Dated Jun. 20, 2010 (21 pages).

Austrian Search Report for Singapore Application No. 200805509-7, mailed on Feb. 3, 2010 (7 pages).

esp@cenet Patent Abstract for European Publication No. 1551115, publication date Jul. 6, 2005. (1 page).

esp@cenet Patent Abstract for European Publication No. 1724948, publication date Nov. 22, 2006. (1 page).

Taiwanese Office Action for Application No. 096101589, mailed on Oct. 1, 2010 (7 pages).

Chinese Office Action for Application No. 2007800096568, mailed on Jul. 20, 2011 (19 pages).

Laroia, Rajiv et al., "An Integrated Approach Based on Cross-Layer Optimization—Designing a Mobile Broadband Wireless Access Network," IEEE Signal Processing Magazine, Sep. 2004.

esp@cenet Patent Abstract for Chinese Patent No. 1484906, publication date Mar. 24, 2004 (1 page).

\* cited by examiner

PRIOR ART

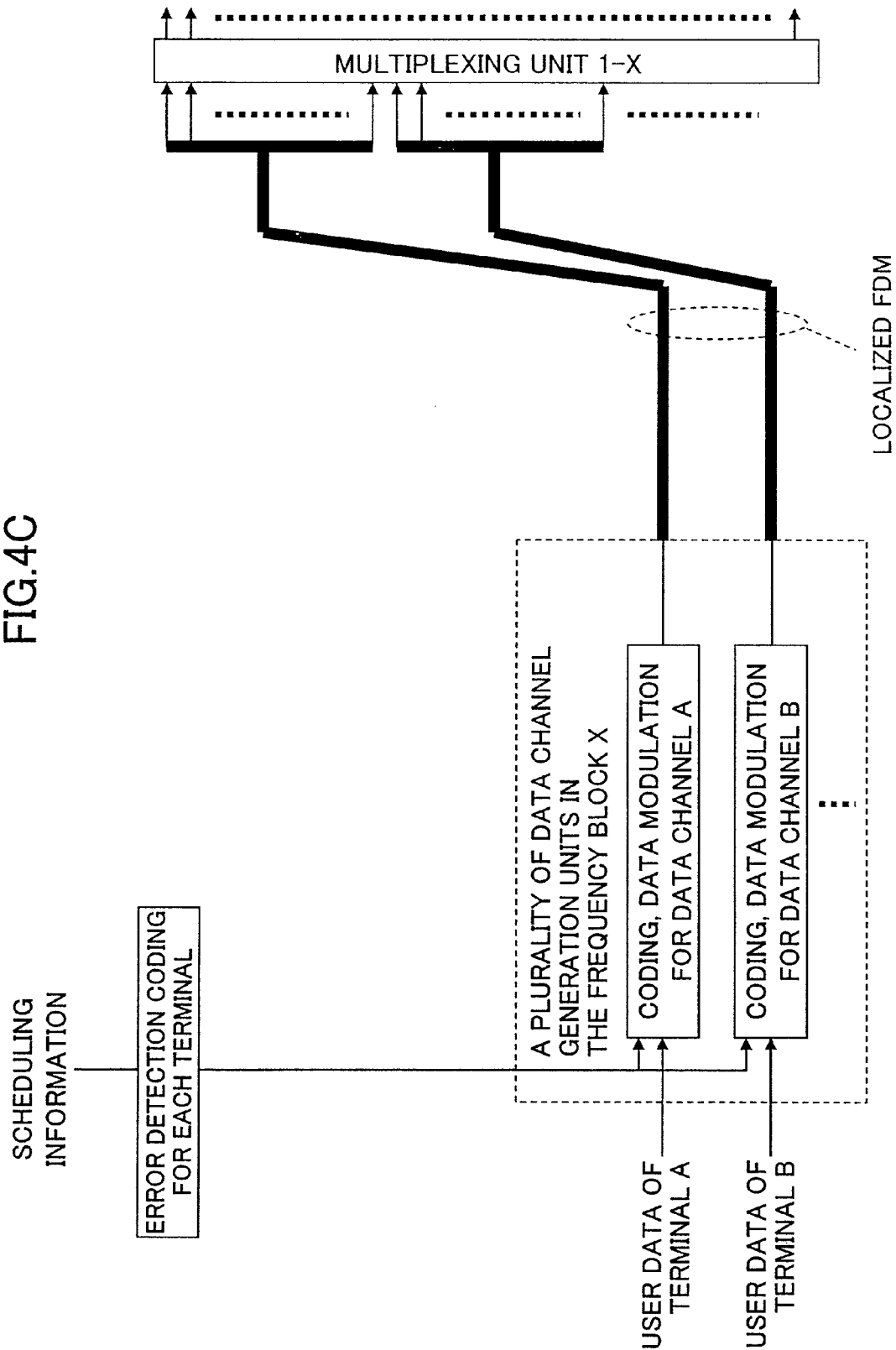

FIG.5A

| TYPES OF CHANNEL | | | INFORMATION ITEMS | |
|---|---|---|---|---|
| BROADCAST CHANNEL | | | TRANSMISSION FORMAT OF L1/L2 CONTROL CHANNEL<br>MAXIMUM VALUE OF SIMULTANEOUSLY ASSIGNED USER NUMBER<br>RESOURCE BLOCK PLACEMENT<br>MIMO SCHEME | |
| INDIVIDUAL L3 SIGNALING CHANNEL | | | TYPE OF FDM SCHEME<br>PERSISTENT SCHEDULING INFORMATION | SPECIFIC CONTROL CHANNEL |
| L1/L2 CONTROL CHANNEL | PART 0 | | TRANSMISSION FORMAT OF L1/L2 CONTROL CHANNEL<br>NUMBER OF SIMULTANEOUSLY ASSIGNED USER NUMBER | NON-SPECIFIC CONTROL CHANNEL |
| | DOWNLINK TRANSMISSION RELATED INFORMATION | PART 1 | PAGING INDICATOR | NON-SPECIFIC CONTROL CHANNEL |
| | | PART 2a | DOWNLINK RESOURCE ASSIGNMENT<br>ASSIGNMENT FREQUENCY<br>MIMO INFORMATION<br>(NUMBER OF STREAMS, etc.) | |
| | | PART 2b | MIMO PRECODING INFORMATION<br>MODULATION SCHEME<br>PAYLOAD SIZE<br>HARQ INFORMATION<br>CRC INFORMATION | SPECIFIC CONTROL CHANNEL |
| | UPLINK TRANSMISSION RELATED INFORMATION | PART 1 | ACH/NACK | SPECIFIC OR NON-SPECIFIC CONTROL CHANNEL |
| | | PART 2 | UPLINK RESOURCE ASSIGNMENT<br>MODULATION SCHEME<br>PAYLOAD SIZE<br>TRANSMISSION POWER<br>CRC INFORMATION | |
| | | PART 3 | TRANSMISSION TIMING CONTROL BIT | |
| | | PART 4 | TRANSMISSION POWER CONTROL BIT | |

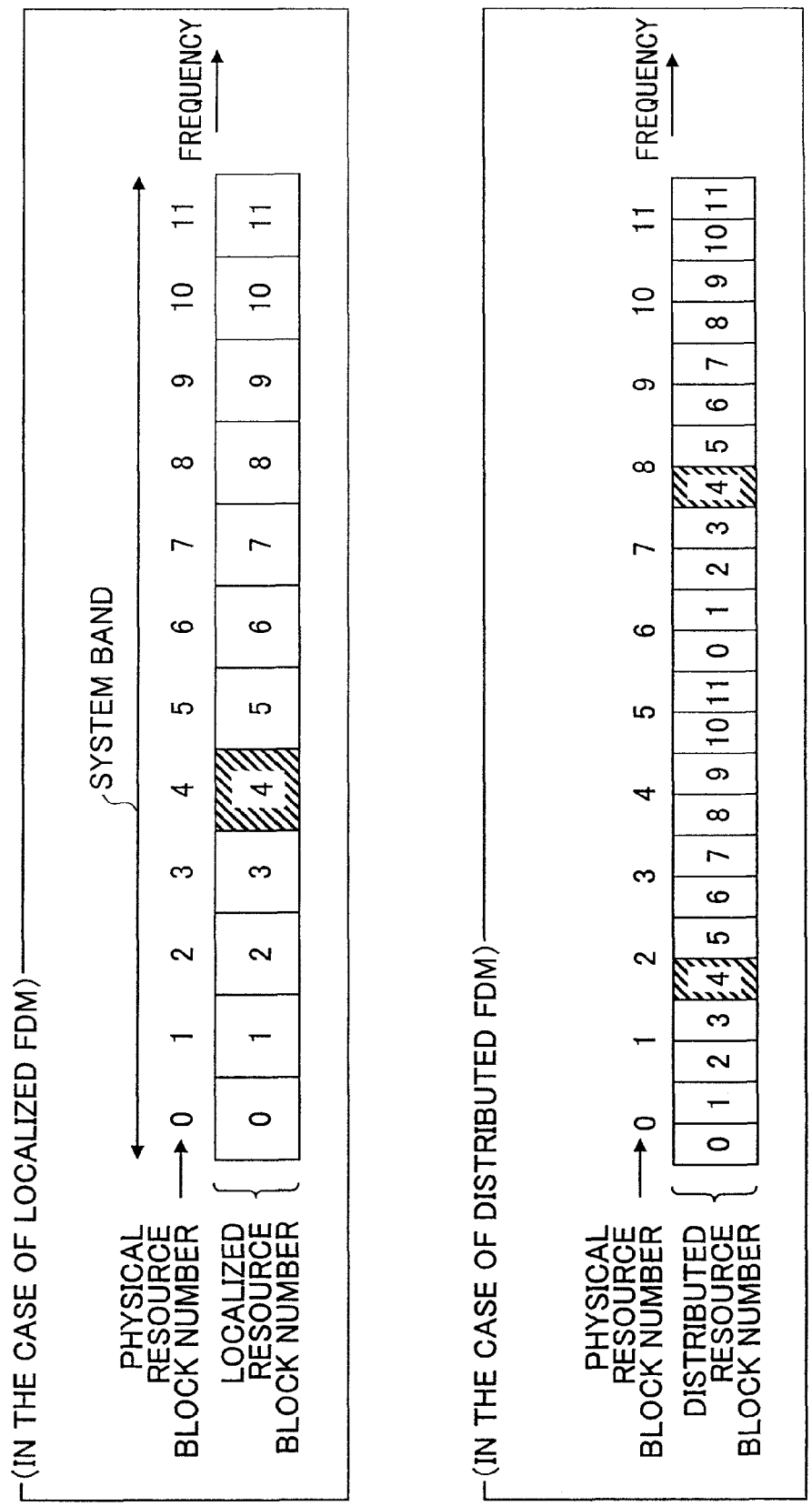

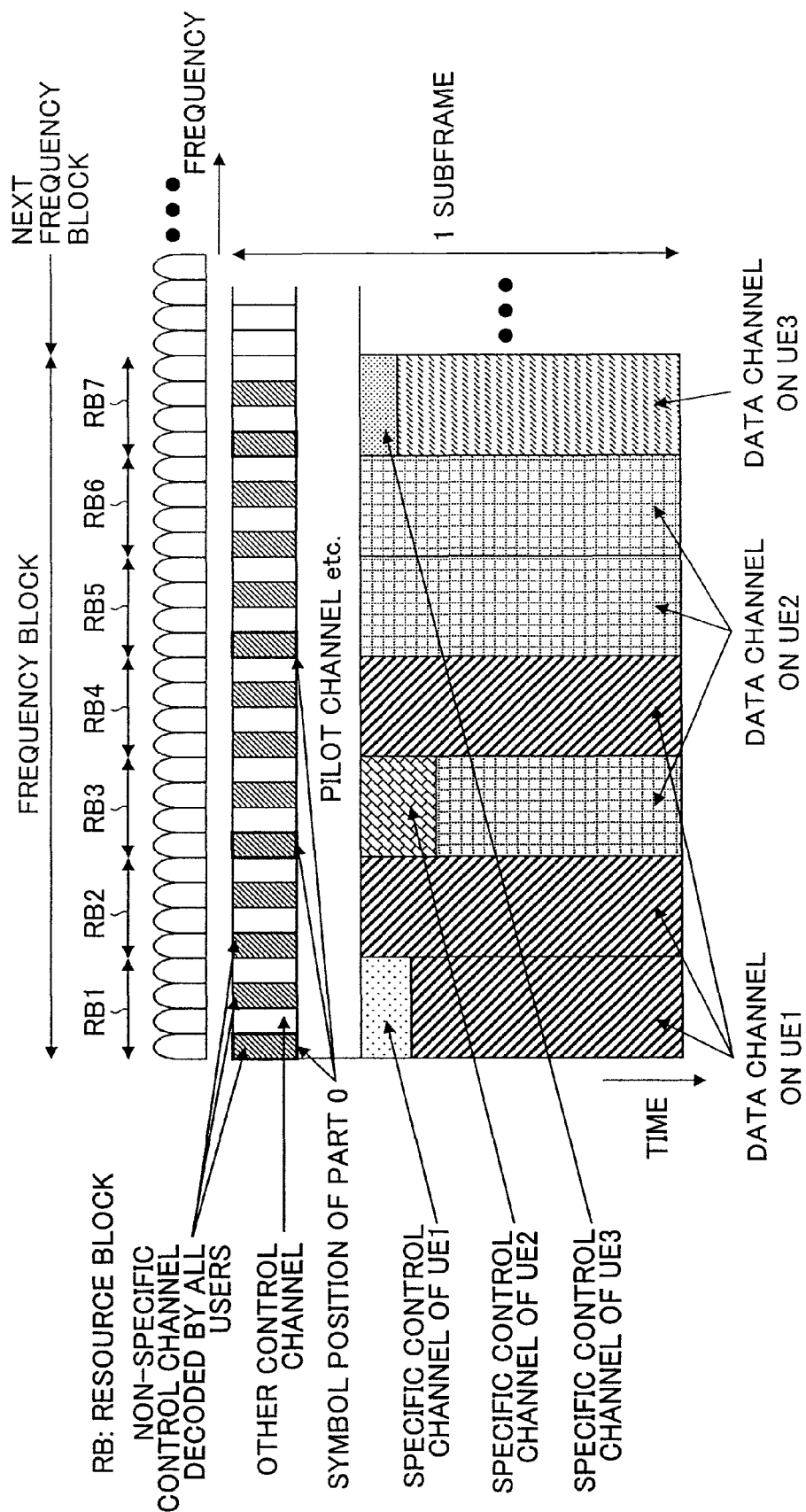

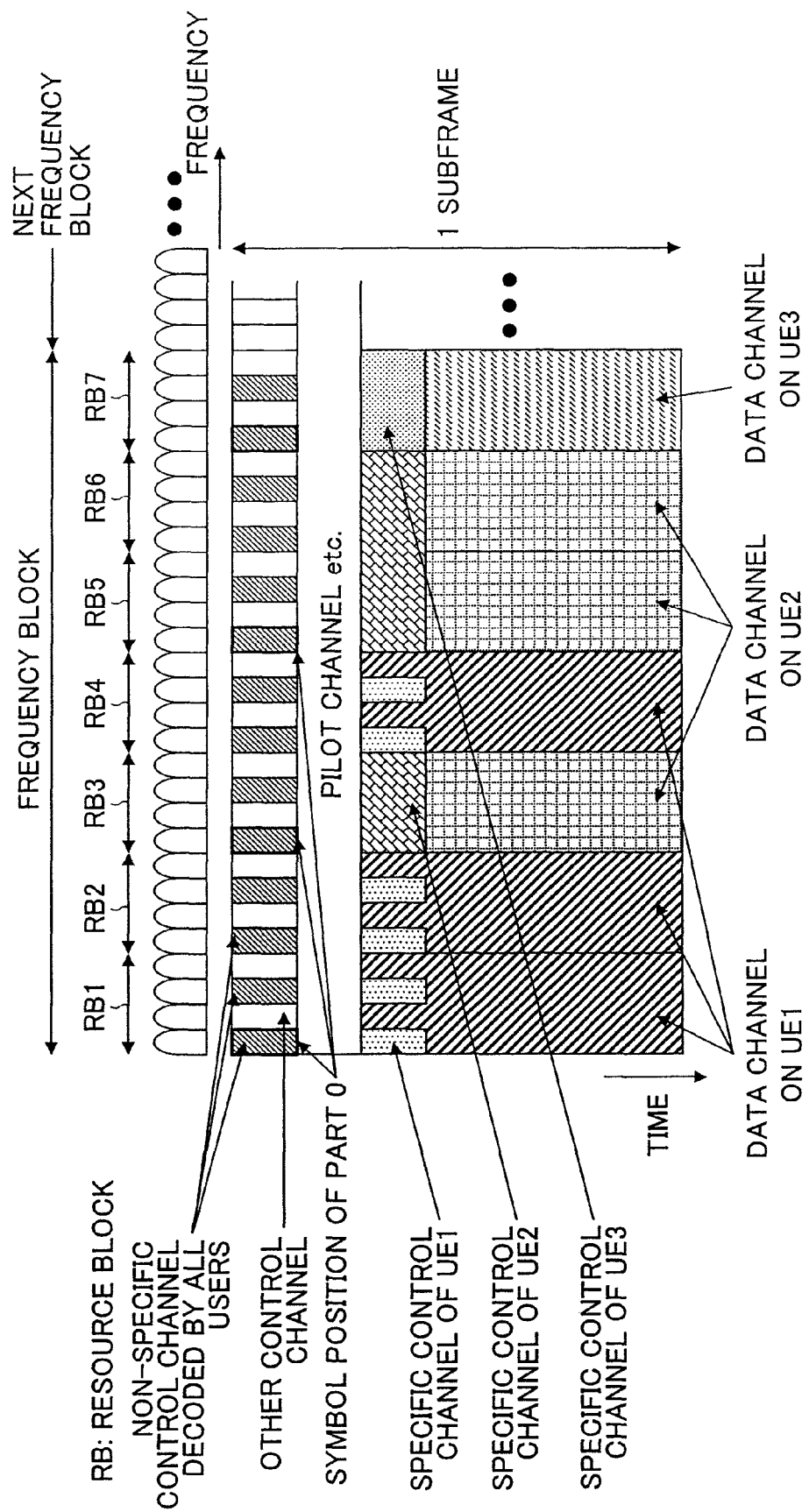

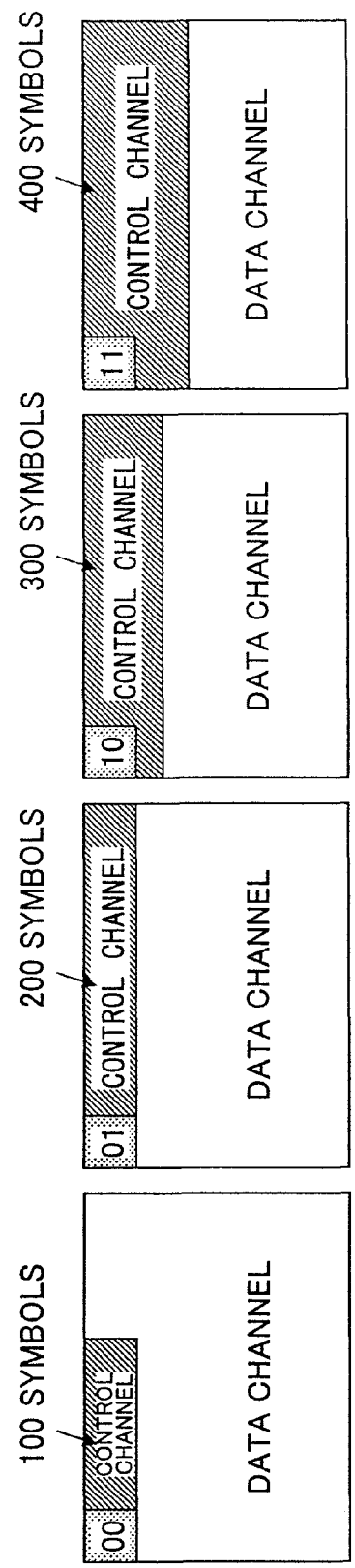

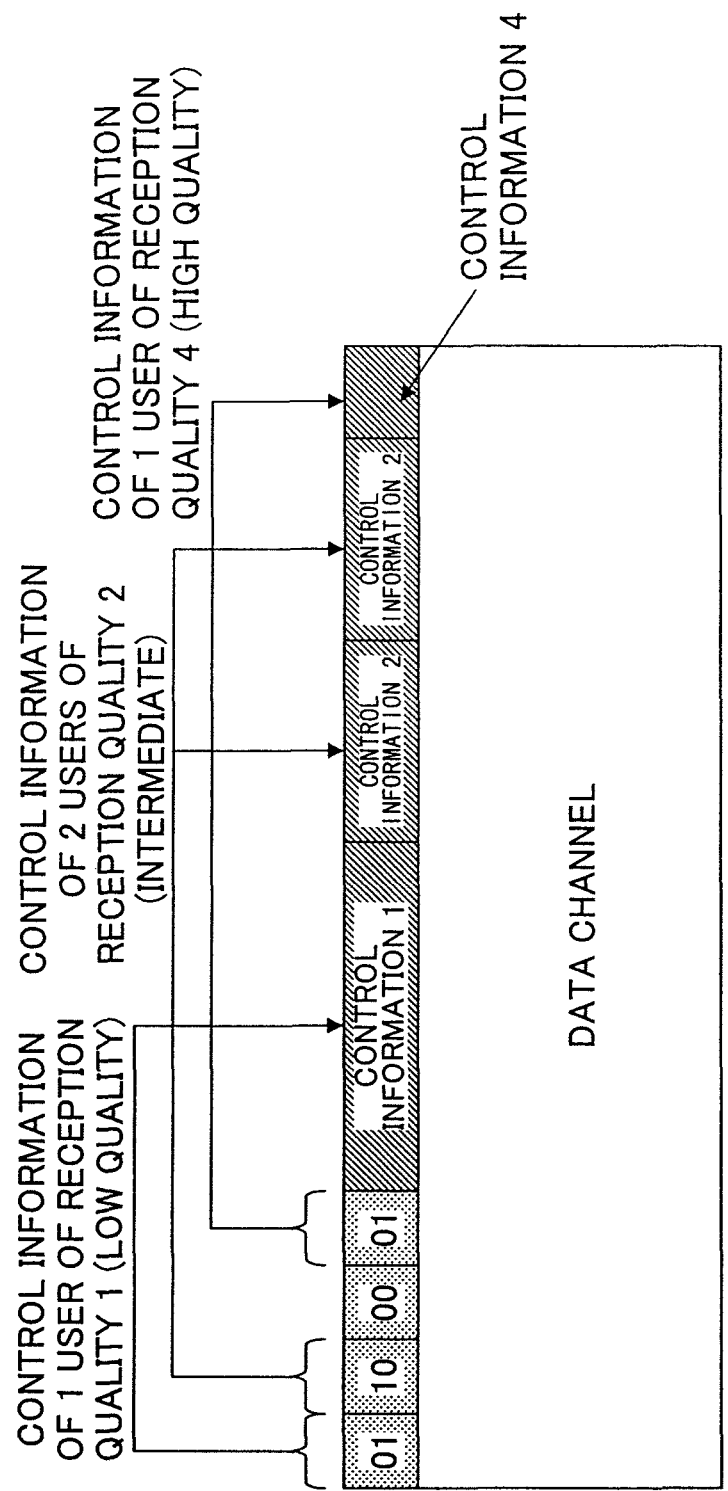

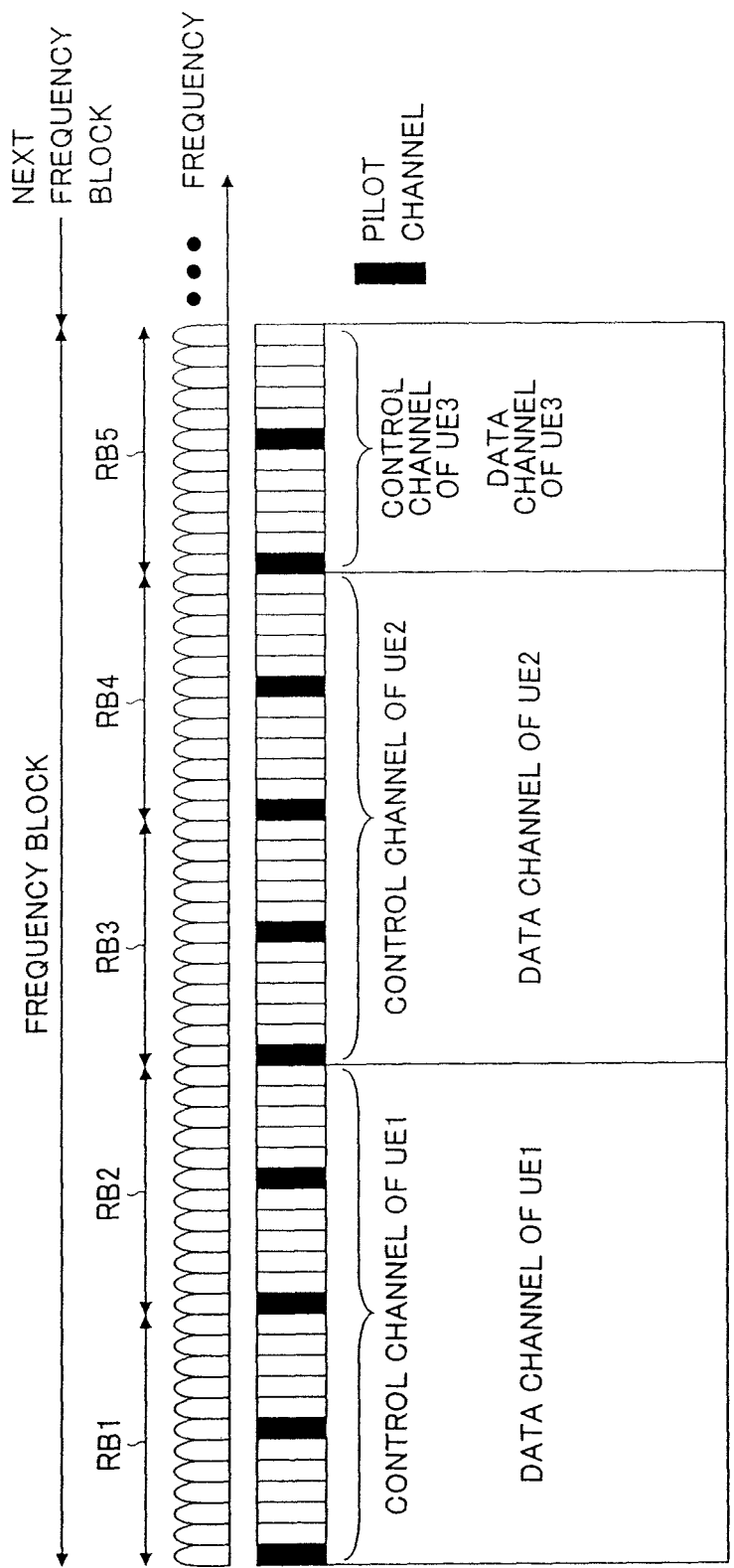

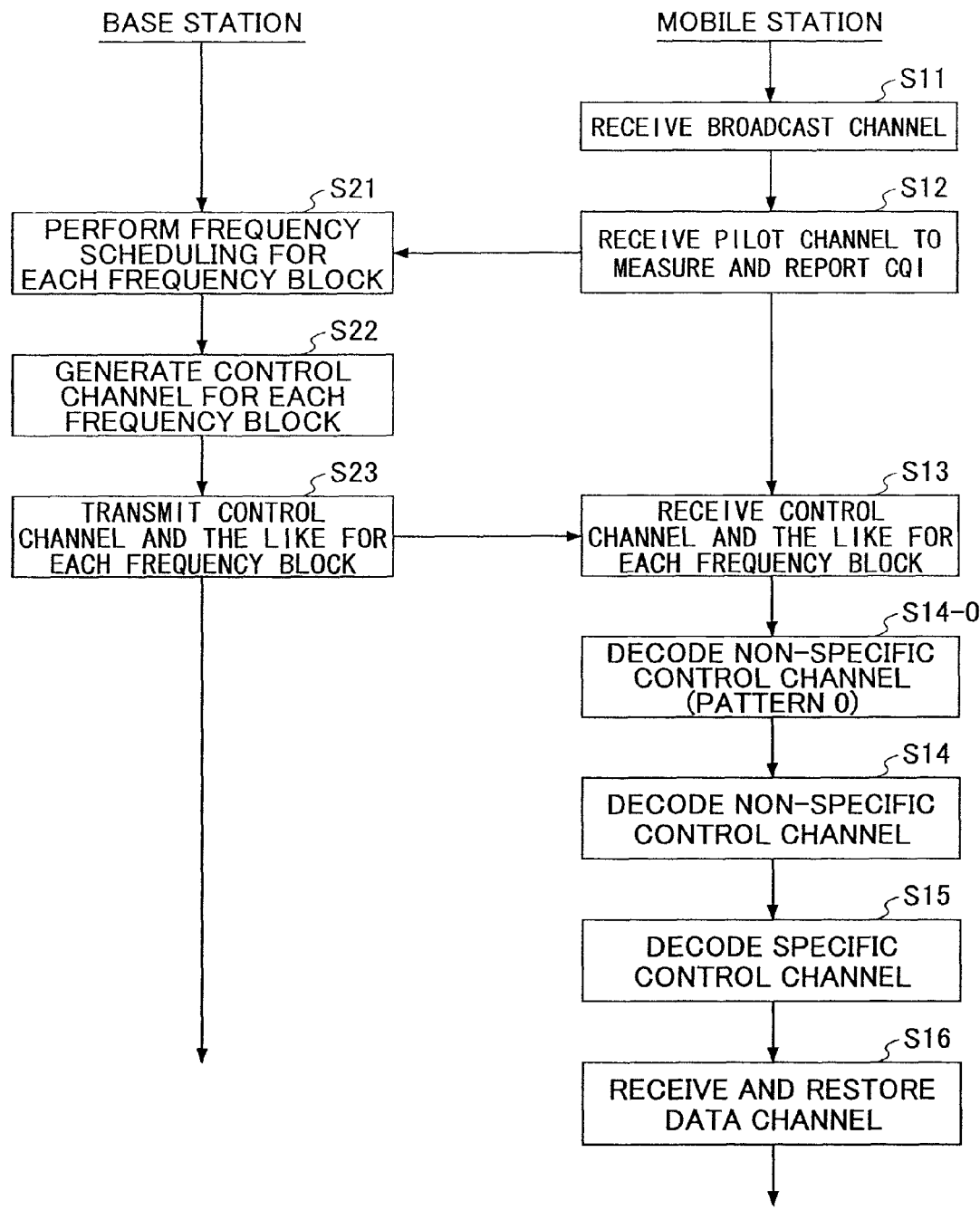

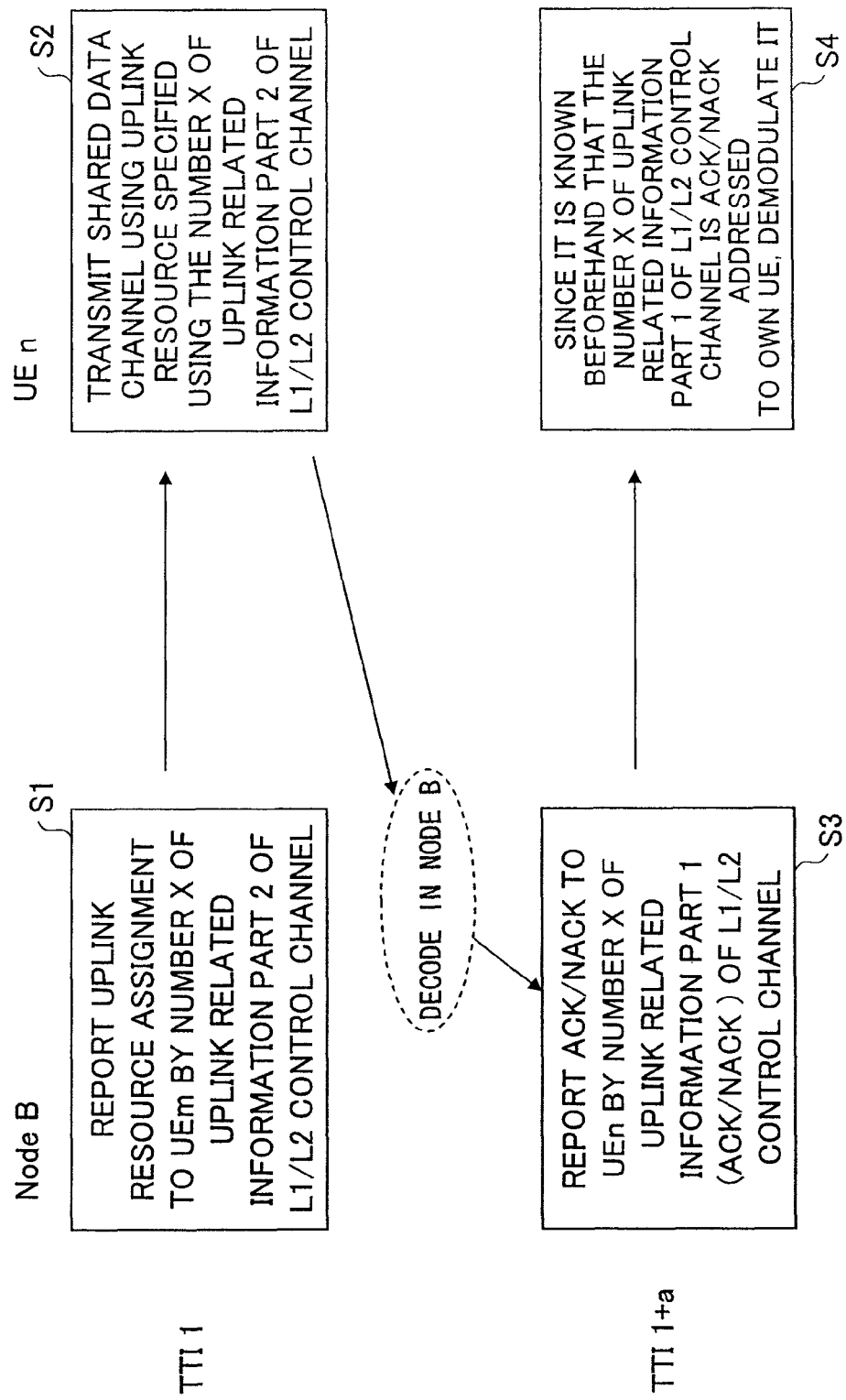

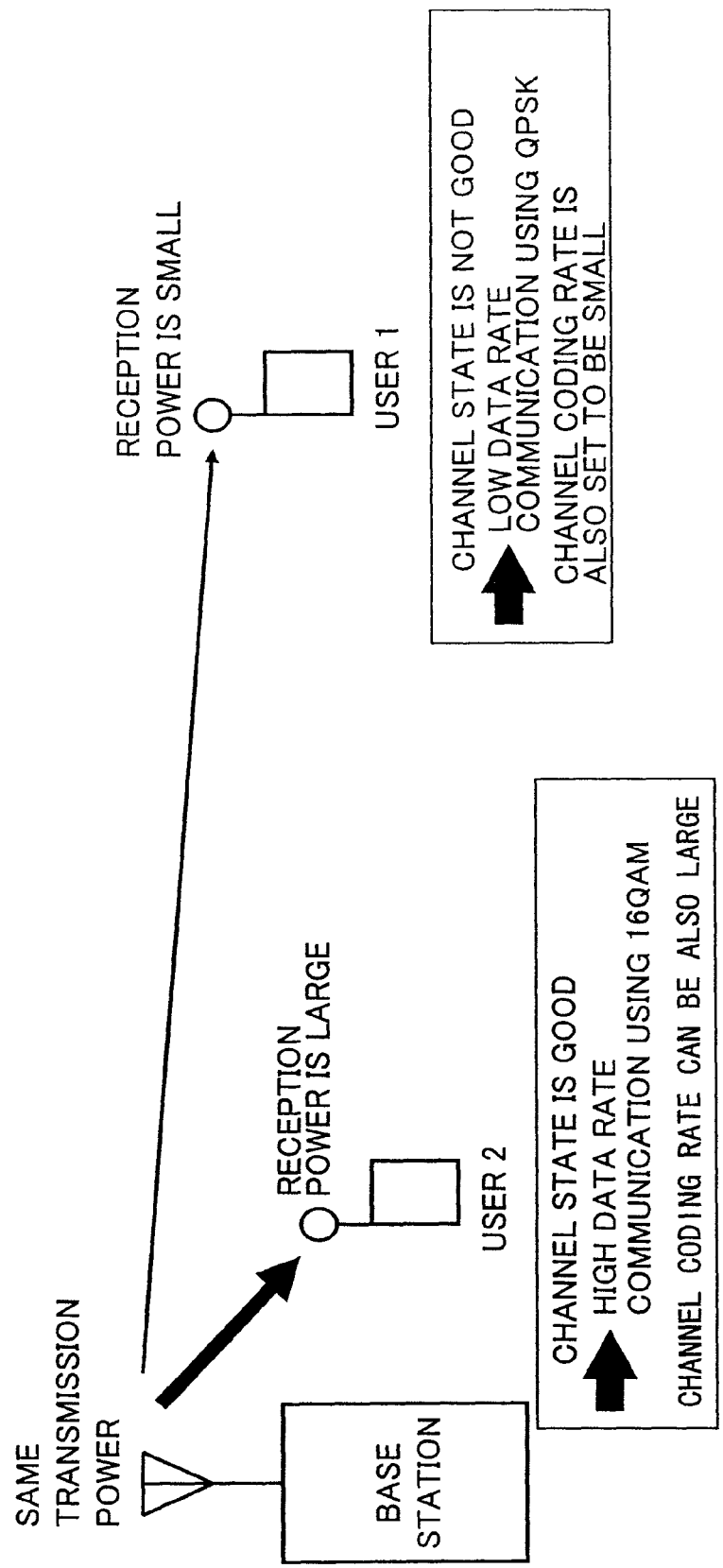

BASE STATION, COMMUNICATION TERMINAL, TRANSMISSION METHOD AND RECEPTION METHOD

CROSS-REFERENCE TO RELATED APPLICATIONS

The present application is a Continuation and claims benefit, pursuant to 35 U.S.C. §120, to U.S. patent application Ser. No. 12/161,429, filed Jul. 18, 2008. That application is hereby incorporated by reference in its entirety.

TECHNICAL FIELD

The present invention relates to a technical field of radio communications. More particularly, the present invention relates to a base station, a communication terminal, a transmission method, and a reception method used for a communication system in which frequency scheduling and multicarrier transmission are performed.

BACKGROUND ART

In this kind of technical field, it is becoming more and more important to realize wideband radio access for performing high speed large capacity communication efficiently. Especially, as for downlink channels, a multicarrier scheme, more particularly, that is an Orthogonal Frequency Division Multiplexing (OFDM) scheme is considered promising from the viewpoint of performing high speed large capacity communications while suppressing multipath fading effectively, and the like. Then, performing frequency scheduling is also proposed in a next generation system in terms of improving throughput by increasing frequency use efficiency.

As shown in FIG. 1, a frequency band that can be used in the system is divided to a plurality of resource blocks (divided to three blocks in the example of the figure), and each of the resource blocks includes one or more subcarriers. The resource block is also called a frequency chunk. A terminal is assigned one or more resource blocks. In frequency scheduling, a resource block is assigned to a terminal in which channel state is good by priority according to received signal quality or channel state information (CQI: Channel Quality Indicator), of each of resource blocks of a downlink pilot channel, reported from terminals, so that transmission efficiency or throughput of the whole system is tried to improve. When frequency scheduling is performed, it is necessary to report content of the scheduling to the terminal, and the report is performed using a control channel (that may be called L1/L2 control signaling channel, associated control channel, low layer control channel, or the like). In addition, a modulation scheme (QPSK, 16QAM, 64QAM and the like, for example) used for the scheduled resource block, a channel coding information (channel coding rate and the like, for example), and a hybrid automatic retransmission request (HARQ: Hybrid Auto Repeat ReQuest) are transmitted using the control channel. The technique for dividing a frequency band into a plurality of resource blocks and changing modulation schemes for each resource block is described in the non-patent document 1, for example.

Non-Patent Document 1

P. Chow, J. Cioffi, J. Bingham, "A Practical Discrete Multitone Transceiver Loading Algorithm for Data Transmission over Spectrally Shaped Channel", IEEE Trans. Commun. vol. 43, No. 2/3/4, February/March/April 1995

DISCLOSURE OF THE INVENTION

Problem to be Solved by the Invention

On the other hand, in a future radio access scheme of next generation, various wide and narrow frequency bands are prepared, so that it may be required that a terminal can use various bands according to locations or usages. In this case, as to frequency bandwidths that the terminal can receive, various wide and narrow frequency bands may be prepared according to usage or price. Also in this case, if frequency scheduling is properly performed, improvement of frequency use efficiency and throughput can be expected. However, since the usable frequency bands for the existing communication system is predicated on fixed bands, when various wide and narrow frequency bands are provided in the base station side and the terminal side, a concrete method has not been established for properly reporting content of scheduling to the terminal or the user while permitting every combinations.

On the other hand, if a specific resource block common to every terminal is fixedly assigned for a control channel, since channel states of terminals are generally different for each resource block, there is a fear that the control channel cannot be properly received depending on the terminal. In addition, when the control channel is distributed to all resource blocks, any terminal may receive the control channel with a certain receive quality. But, it becomes difficult to expect receive quality better than that. Therefore, it is desired to transmit a control channel to terminals with higher quality.

In addition, when adaptive modulation and coding (AMC) control is performed in which modulation schemes and channel coding rates are adaptively changed, a number of symbols necessary for transmitting the control channel is different for each terminal. This is because an information amount transmitted per one symbol is different depending on combination in AMC. In addition, in future systems, it is considered to transmit and receive separate signals using a plurality of antennas provided in each of a transmission side and a receiving side. In this case, the before-mentioned control information such as scheduling information and the like may be necessary for each of the signals communicated by each antenna. Therefore, in this case, the number of symbols necessary for transmitting the control channel is different not only for each terminal, but also, there is a possibility that it is different according to the number of antennas used for the terminal. When an amount of information that should be transmitted using the control channel is different for each terminal, for using resources efficiently, it is necessary to use a variable format that can flexibly support variation of the control information amount. But, there is a fear that signal processing load in the transmitting side and the receiving side becomes large. In contrast, when the format is fixed, it is necessary to reserve a field specific for the control channel adapting to a maximum information amount. But, by doing that, even if the field specific for the control channel is unoccupied, resources of that part are not used for data transmission, so that it contradicts the requirement of effective use of resources. Therefore, it is desired to transmit the control channel easily and efficiently.

The present invention is contrived for solving at least one of the above-mentioned problems, and the object is to provide a base station, a communication terminal, a transmission method and a reception method for efficiently transmitting a control channel to various terminals in which bandwidths by which communication can be performed are different, in a communication system in which a frequency band assigned to the communication system is divided into a plurality of frequency blocks each of which includes a plurality of resource blocks each including one or more subcarriers, and a terminal performs communication using one or more frequency blocks.

Means for Solving the Problem

A base station using in an embodiment of the present invention is used in a communication system in which a frequency band provided to the communication system includes a plurality of frequency blocks wherein each of the frequency blocks includes a plurality of resource blocks each including one or more subcarriers. The base station communicates with a communication terminal that uses one or more frequency blocks. The base station includes:

means configured to manage correspondence relationship between bandwidths by which individual communication terminals can perform communication and frequency blocks to be assigned to the communication terminals;

a frequency scheduler configured to determine, for each frequency block, scheduling information for assigning one or more resource blocks to a communication terminal being in a good channel state;

means configured to generate a control channel including the scheduling information for each frequency block;

multiplexing means configured to frequency multiplexing control channels generated for each frequency block within the frequency band provided to the communication system; and means configured to transmit an output signal of the multiplexing means using a multicarrier scheme.

A base station used in an embodiment of the present invention is a base station of a multicarrier scheme that performs frequency scheduling in a frequency band including a plurality of resource blocks each including one or more subcarriers. The base station includes:

a frequency scheduler configured to determine scheduling information for assigning one or more resource blocks to a communication terminal in a good channel state based on channel state information reported from individual communication terminals; and means configured to perform coding and modulation for a control channel including a non-specific control channel to be decoded by a non-specific communication terminal and a specific control channel to be decoded by a specific communication terminal to which one or more resource blocks are assigned;

multiplexing means configured to time multiplexing the non-specific control channel and the specific control channel according to the scheduling information; and means configured to transmit an output signal of the multiplexing means using a multicarrier scheme.

A base station used in an embodiment of the present invention is a base station of a multicarrier scheme that performs frequency scheduling in a frequency band including a plurality of resource blocks each including one or more subcarriers. The base station includes:

a frequency scheduler configured to determine scheduling information for assigning one or more resource blocks to a communication terminal in a good channel state based on channel state information reported from individual communication terminals;

multiplexing means configured to multiplex a control channel and a data channel according to the scheduling information; and means configured to transmit an output signal of the multiplexing means using a multicarrier scheme. A control channel to be decoded by a specific communication terminal is mapped over the frequency band including a plurality of resource blocks in a distributed manner.

A base station used in an embodiment of the present invention is a base station of a multicarrier scheme that performs frequency scheduling in a frequency band including a plurality of resource blocks each including one or more subcarriers. The base station includes:

a frequency scheduler configured to determine scheduling information for assigning one or more resource blocks to a communication terminal in a good channel state based on channel state information reported from individual communication terminals;

multiplexing means configured to multiplex a control channel and a data channel according to scheduling information; and means configured to transmit an output signal of the multiplexing means using a multicarrier scheme. A control channel to be decoded by a specific communication terminal is mapped limitedly to a resource block assigned to the specific communication terminal.

A base station used in an embodiment of the present invention is a base station of a multicarrier scheme that performs frequency scheduling in a frequency band including a plurality of resource blocks each including one or more subcarriers. The base station includes:

a frequency scheduler configured to determine scheduling information for assigning one or more resource blocks to a communication terminal in a good channel state based on channel state information reported from individual communication terminals; and means configured to perform coding and modulation for a control channel including a non-specific control channel to be decoded by a non-specific communication terminal and a specific control channel to be decoded by a specific communication terminal to which one or more resource blocks are assigned;

multiplexing means configured to time multiplex the non-specific control channel and the specific control channel according to the scheduling information; and means configured to transmit an output signal of the multiplexing means using a multicarrier scheme. The non-specific control channel includes information indicating a transmission format of the non-specific control channel.

Effect of the Invention

According to the present invention, it becomes possible to efficiently transmit a control channel to various terminals in which bandwidths by which communication can be performed are different, in a communication system in which each of a plurality of frequency blocks forming a system frequency band includes a plurality of resource blocks each including one or more subcarriers.

BRIEF DESCRIPTION OF THE DRAWINGS

FIG. 4C is a diagram showing signal processing elements on a control channel;

FIG. 5A is a diagram showing information item examples of control signaling channels;

FIG. 5B is a diagram showing a localized FDM scheme and a distributed FDM scheme;

FIG. 7A is a diagram showing a mapping example of data channels and control channels;

FIG. 7B is a diagram showing a mapping example of data channels and control channels;

FIG. 7C is a diagram showing format examples of the L1/L2 control channel;

FIG. 7D is a diagram showing format examples of the L1/L2 control channel;

FIG. 7H is a diagram showing a mapping example of data channels and control channels;

FIG. 9 is a flowchart showing an operation example according to an embodiment of the present invention;

FIG. 10D is a diagram showing a method example for decreasing information amount of uplink data transmission related information;

FIG. 14 is a diagram showing a manner in which AMC control is performed.

Figure 1:
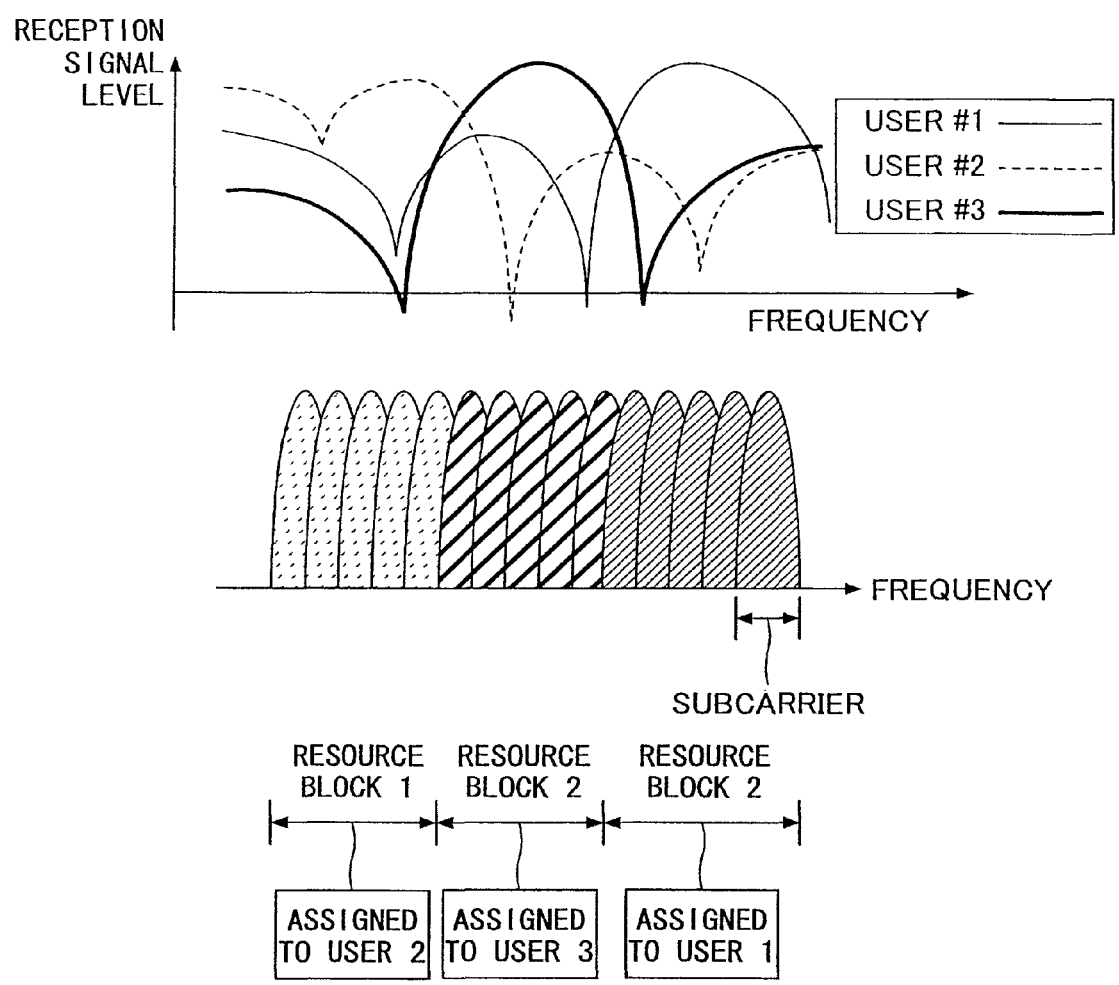
FIG. 1 is a diagram for explaining frequency scheduling.

DESCRIPTION OF REFERENCE SIGNS 31 frequency block assignment control unit
32 frequency scheduling unit
33-$x$ control signaling channel generation unit in frequency block x
34-$x$ data channel generation unit n frequency block x
35 broadcast channel (or paging channel) generation unit
1-$x$ first multiplexing unit on frequency block x
37 second multiplexing unit
38 third multiplexing unit
39 other channel generation unit
40 Inverse Fast Fourier Transform unit
41 cyclic prefix adding unit
41 non-specific control channel generation unit
42 specific control channel generation unit
43 multiplexing unit
81 carrier frequency tuning unit
82 filtering unit
83 cyclic prefix removing unit
84 fast Fourier transform unit (FFT)
85 CQI measurement unit
86 broadcast channel decoding unit
87-0 non-specific control channel (part 0) decoding unit
87 non-specific control channel decoding unit
88 specific control channel decoding unit
89 data channel decoding unit

PREFERRED EMBODIMENTS FOR CARRYING OUT THE INVENTION

According to an embodiment of the present invention, frequency scheduling is performed for each frequency, and the control channel for reporting scheduling information is generated for each frequency block in accordance with a minimum bandwidth. Accordingly, the control channel can be efficiently transmitted to various communication terminals in which bandwidths by which communication can be performed are different. The communication terminal is a mobile terminal or a mobile station typically, but it may be a fixed terminal or a fixed station. The communication terminal may be called a user apparatus.

The control channels generated for each frequency block may be frequency multiplexed according to a predetermined hopping pattern. This can equalize communication quality among communication terminals and among frequency blocks.

A broadcast channel may be transmitted using a band that is a band including a center frequency of the frequency band provided to the communication system and that has a bandwidth corresponding to one frequency block. This allows any communication terminal that tries to access the communication system to easily connect to the communication system by receiving a signal of a minimum bandwidth in the vicinity of the center frequency.

A paging channel is also transmitted using a band that is a band including a center frequency of the frequency band provided to the communication system and that has a bandwidth corresponding to one frequency block. This makes it possible to combine a reception band when standby and a band for performing cell search, so that this is preferable from the viewpoint that a number of times of frequency tuning can be decreased as much as possible.

From the viewpoint of using the whole frequency band evenly, a paging channel for paging a communication terminal may be transmitted using a frequency block assigned to the communication terminal.

According to an embodiment of the present invention, the control channel may be separated to a non-specific control channel to be decoded by a non-specific communication terminal and a specific control channel to be decoded by a specific communication terminal to which one or more resource blocks are assigned, and these channels may be coded and modulated separately. The non-specific control channel and the specific control channel are time multiplexed according to scheduling information so that the control channel is transmitted using a multicarrier scheme. Accordingly, the control channel can be efficiently transmitted without waste of resources using a fixed format even though control information amounts are different for each communication terminal.

The non-specific control channel may be mapped over the frequency band in a distributed manner, and the specific control channel relating to a specific communication terminal may be mapped limitedly to a resource block assigned to the specific communication terminal. While the quality of the non-specific control channel can be kept to be equal to or greater than a certain level over the whole users, the quality of the specific control channel can be made good. This is because the specific control channel is mapped to a resource block in a good channel state for each of the specific communication terminals.

A downlink pilot channel may be also mapped over a plurality of resource blocks assigned to a plurality of communication terminals in a distributed manner. By mapping the pilot channel over a wide band, channel estimation accuracy and the like can be improved.

According to an embodiment of the present invention, from the viewpoint of maintaining or improving reception quality of the control channel including the non-specific and specific control channels, transmission power control is performed on the non-specific control channel, and one or both of transmission power control and adaptive modulation and coding control are performed on the specific control channel.

Transmission power control for the non-specific control channel may be performed such that the specific communication terminal to which a resource block is assigned can receive the non-specific control channel with high quality. This is because, although every user or communication terminal that received the non-specific control channel is obliged to try demodulation, it is only necessary that the user to which a resource block is actually assigned succeeds demodulation eventually.

The non-specific control channel may include information of one or both of a modulation scheme and a coding scheme applied to the specific control channel. Since the combination of the modulation scheme and the coding scheme for the non-specific control channel is fixed, the user to which the resource block is assigned can obtain the modulation scheme and the coding scheme and the like for the specific control channel by demodulating the non-specific control channel. By this method, adaptive modulation and coding control can be performed on the part of the specific control channel in the control channel, so that reception quality of the part can be improved.

When the transmission power control and the adaptive modulation and coding control are performed for the control channel, a total number of combinations of modulation schemes and coding schemes for the specific control channel may be prepared to be less than a total number of combinations of modulation schemes and coding schemes for the shared data channel. This is because, although required quality can be obtained by the adaptive modulation and coding control, required quality can be obtained by performing transmission power control.

Embodiment 1

Figure 2:
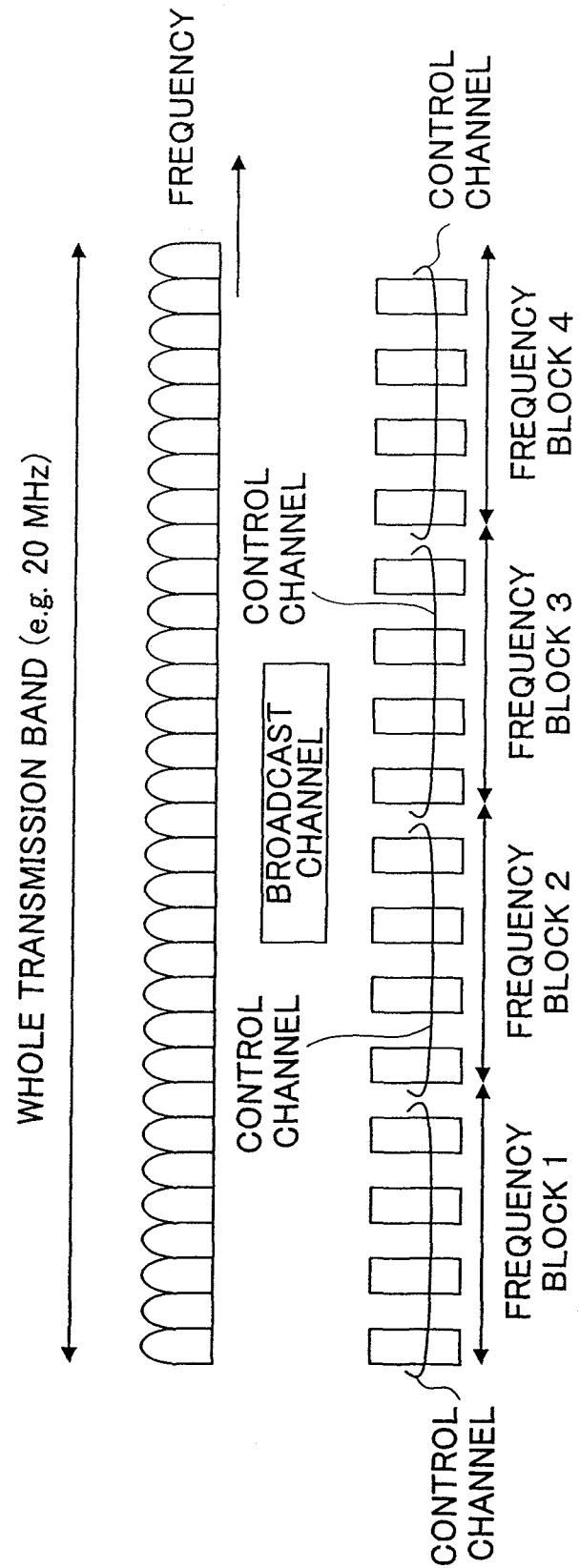
FIG. 2 is a diagram showing a frequency band used in an embodiment of the present invention.

FIG. 2 shows a frequency band used in an embodiment of the present invention. Although concrete numeric values are used for the sake of description, the values are merely examples, and various values may be used. The frequency band (whole transmission band) provided for the communication system has a bandwidth of 20 MHz as an example. The whole transmission band includes four frequency blocks 1-4, and each of the frequency blocks includes a plurality of resource blocks each including one or more subcarriers. The example shown in the figure schematically shows that each frequency block includes many subcarriers. In the present embodiment, four types of 5 MHz, 10 MHz, 15 MHz and 20 MHz are prepared as bandwidths for performing communication. A terminal uses one or more frequency blocks to perform communication using one of the four bandwidths. A terminal performing communication in the communication system may be able to perform communication by using any of the four bands, or may be able to perform communication by using only some of the bandwidths. However, it is necessary to be able to perform communication using at least 5 MHz band. Or, instead of preparing such a plurality of kinds of bands, a standard may be defined such that any communication terminal can perform communication in the whole of the system bandwidth. For providing more general description, a case in which choices of four kinds of bandwidths are prepared in the following embodiments is described. However, it can be understood that the present invention is applicable irrespective of presence or absence of such choices of the bandwidths.

In the present embodiment, a control channel (L1/L2 control signaling channel or low layer control channel) for reporting scheduling information of a data channel (shared data channel) is formed by the minimum bandwidth (5 MHz), and the control channel is independently provided for each frequency block. For example, when a terminal performing communication using a bandwidth of 5 MHz performs communication using a frequency block 1, the terminal receives a control channel prepared for the frequency block 1 so that the terminal can obtain content of scheduling. Which frequency block the terminal can use for communication may be reported beforehand using a broadcast channel, for example. In addition, after starting communication, a frequency block to be used may be changed. When a terminal performing communication using a bandwidth of 10 MHz performs communication using frequency blocks 1 and 2, the terminal uses adjacent two frequency blocks, and receives both control channels prepared for the frequency blocks 1 and 2 so that the terminal can obtain content of scheduling over a range of 10 MHz. A terminal that performs communication using a bandwidth of 15 MHz uses adjacent three frequency blocks, and when the terminal performs communication using frequency blocks 1, 2 and 3, the terminal receives all control channels prepared for the frequency blocks 1, 2 and 3 so that the terminal can obtain content of scheduling over the range of 15 MHz. A terminal that performs communication using a bandwidth of 20 MHz receives all control channels provided for all frequency blocks so that the terminal can obtain content of scheduling over the range of 20 MHz.

In the figure, four discrete blocks are shown in a frequency block with respect to the control channel. This shows that the control channel is distributed and mapped into a plurality of resource blocks in the frequency block. A concrete mapping example of the control channel is described later.

Figure 3A:
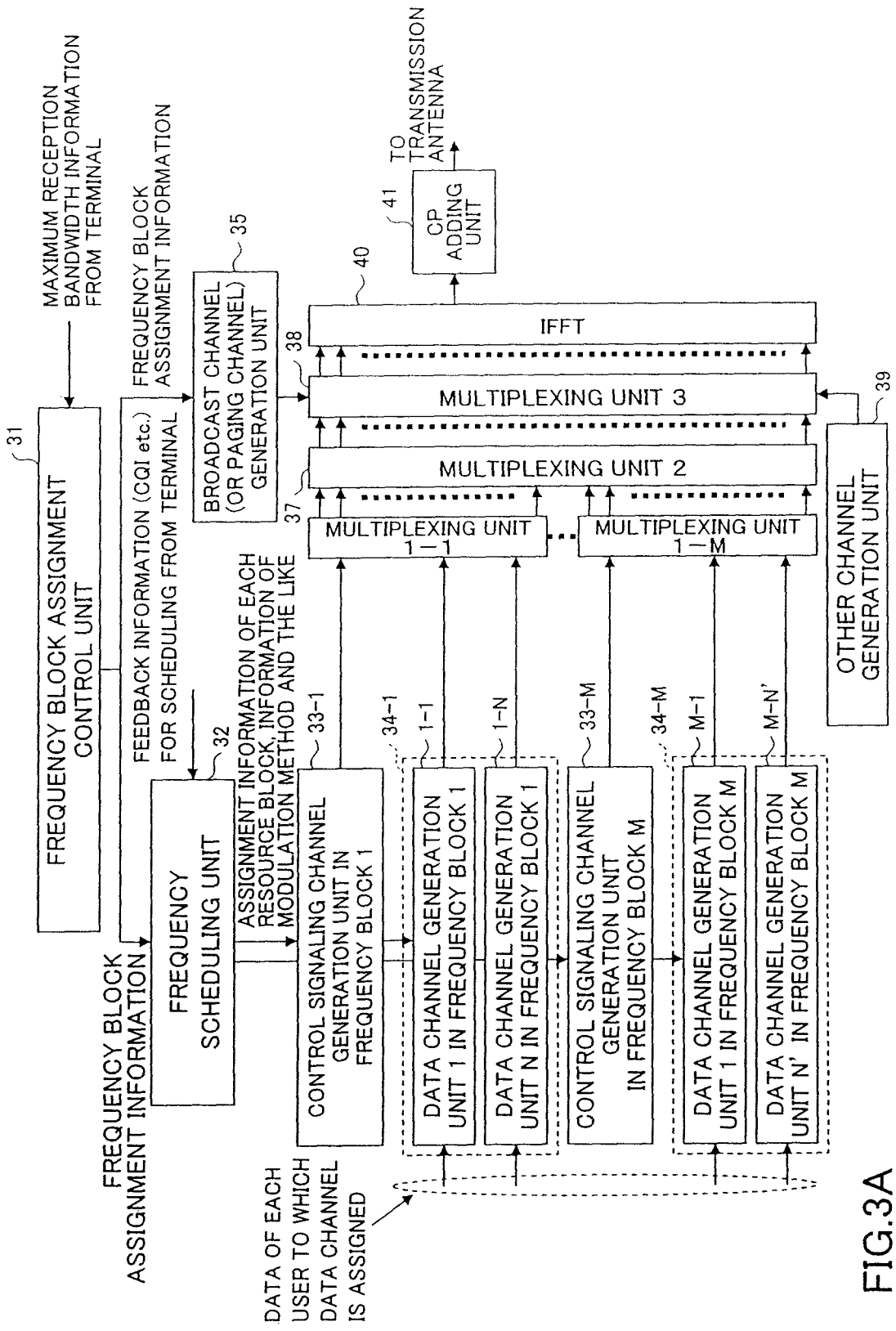
FIG. 3A shows a partial block diagram of a base station according to an embodiment of the present invention (1)

FIG. 3A shows a partial block diagram of a base station according to an embodiment of the present invention. FIG. 3A shows a frequency block assignment control unit 31, a frequency scheduling unit 32, a control signaling channel generation unit 33-1 and a data channel generation unit 34-1 in the frequency block 1, . . . , a control signaling channel generation unit 33-M and a data channel generation unit 34-M in the frequency block M, a broadcast channel (or paging channel) generation unit 35, a first multiplexing unit 1-1 for the frequency block 1, . . . , a first multiplexing unit 1-M for the frequency block M, a second multiplexing unit 37, a third multiplexing unit 38, an other channel generation unit 39, an Inverse Fast Fourier Transform unit 40 (IFFT) and a cyclic prefix adding unit 41.

Based on information relating to a maximum bandwidth by which communication can be performed reported from a terminal (that may be a mobile terminal or a fixed terminal), the frequency block assignment control unit 31 checks a frequency block to be used by the terminal. The frequency block assignment control unit 31 manages correspondence relationship between individual terminals and frequency blocks, and reports the content to the frequency scheduling unit 32. Which frequency block can be used for communication by a terminal that can perform communication using a bandwidth may be reported beforehand using a broadcast channel. For example, the broadcast channel may permit a user performing communication using the bandwidth of 5 MHz to use any one band of frequency blocks 1, 2, 3 and 4, or use may be limited to any of these. In addition, a user that performs communication using a bandwidth of 10 MHz is permitted to use a combination of adjacent two frequency blocks such as frequency blocks (1, 2), (2, 3) or (3, 4). All of these may be permitted to use, or use may be limited to any one of the combinations. A user that performs communication using a bandwidth of 15 MHz is permitted to use a combination of adjacent three frequency blocks such as frequency blocks (1, 2, 3) or (2, 3, 4). Both of them may be permitted to use, or use may be limited to any one of the combinations. A user that performs communication using a bandwidth of 20 MHz is permitted to use all of the frequency blocks. As described later, a usable frequency block may be changed after starting communication according to a predetermined frequency hopping pattern.

The frequency scheduling unit 32 performs frequency scheduling in each of the plurality of frequency blocks. Frequency scheduling in one frequency block determines scheduling information so as to assign a resource block preferentially to a terminal having a good channel state based on channel state information CQI of each resource block reported from terminals.

The control signaling channel generation unit 33-1 in the frequency block 1 uses resource blocks only in the frequency block 1 to configure a control signaling channel for reporting scheduling information in the frequency block 1 to terminals. Similarly, as to other frequency block, a control signaling channel for reporting scheduling information in the frequency block to terminals is configured using resource blocks only in the frequency block.

The data channel generation unit 34-1 in the frequency block 1 generates a data channel to be transmitted using one or more resource blocks in the frequency block 1. Since the frequency block 1 may be shared by one or more terminals (users), N data channel generation units 1-1-N are prepared in the example shown in the figure. Similarly, as to other frequency block, data channels of terminals that share the frequency block are generated.

A first multiplexing unit 1-1 for the frequency block 1 multiplexes signals relating to the frequency block 1. This multiplexing at least includes frequency multiplexing. How the control signaling channel and the data channel are multiplexed is described later. Similarly, other first multiplexing unit 1-x multiplexes the control signaling channel and the data channel transmitted using the frequency block x.

The second multiplexing unit 37 performs operation for changing position relationship among the various multiplexing units 1-x (x=1, . . . , M) on the frequency axis according to a predetermined hopping pattern. This function is described in the second embodiment.

The broadcast channel (or paging channel) generation unit 35 generates broadcast information such as office data to be reported to terminals under the base station. Information indicating relationship between a maximum frequency band by which the terminal can perform communication and a frequency block that the terminal can use may be included in control information. When the usable frequency block variously changes, the broadcast information may include information specifying a hopping pattern that indicates how the frequency block changes. By the way, the paging channel may be transmitted using a same band as the broadcast channel, or may be transmitted using a frequency block used in each terminal.

Other channel generation unit 39 generates a channel other than the control signaling channel and the data channel. For example, the other channel generation unit 39 generates a pilot channel. A pilot channel or a pilot signal is some sort of proper signal that is known in the transmission side and the reception side, and it may be referred to as a reference signal, a reference signal, a known signal, a training signal and the like.

The third multiplexing unit 38 multiplexes the control signaling channels and the data channels of each frequency block, and, the broadcast channel and/or other channel as necessary.

The Inverse fast Fourier transform unit 40 performs inverse fast Fourier transform on a signal output from the third multiplexing unit 38 to perform modulation based on the OFDM scheme.

The cyclic prefix (CP) adding unit 41 adds a guard interval to a symbol after modulation of the OFDM scheme to generate a transmission symbol. The transmission symbol may be generated by adding a series of data at the end (or top) of the OFDM symbol to the top (or end).

Figure 3B:
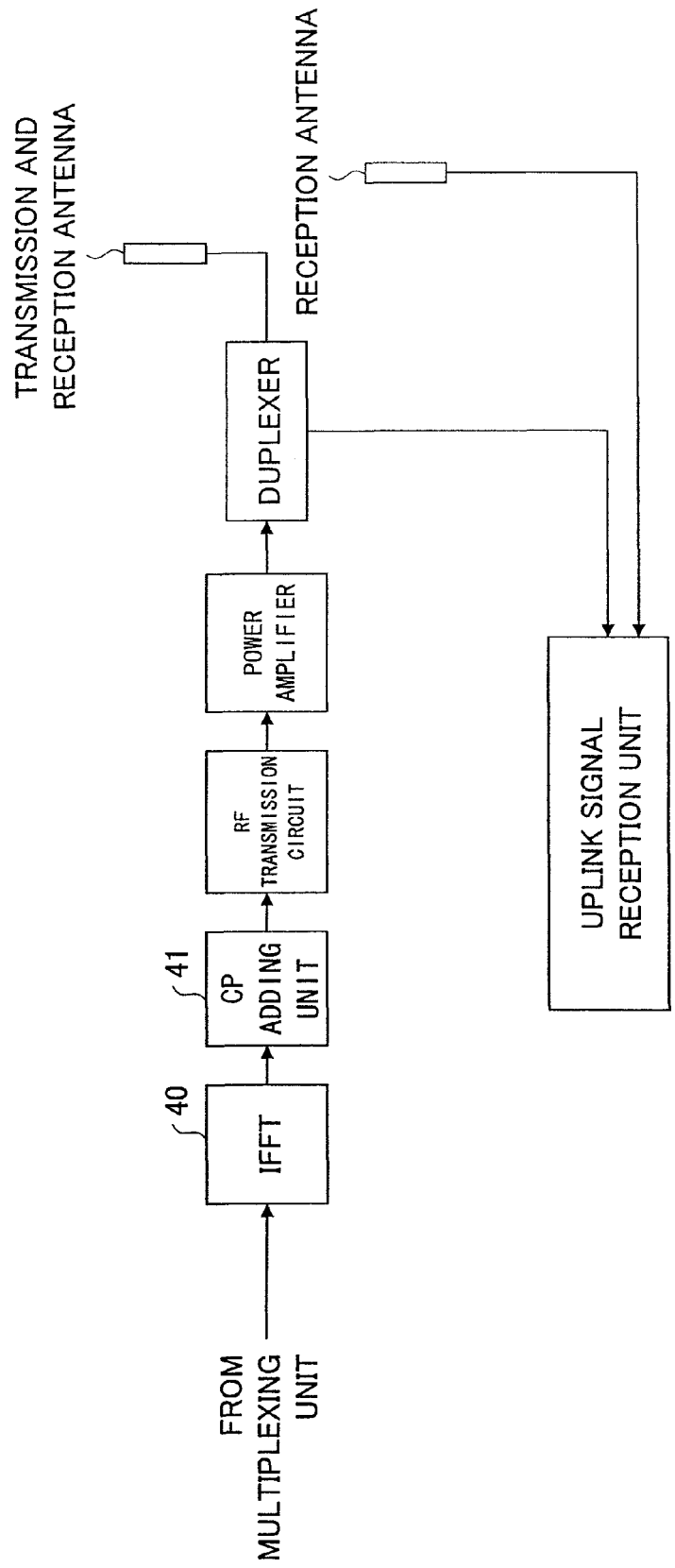
FIG. 3B shows a partial block diagram of a base station according to an embodiment of the present invention (2)

FIG. 3B shows elements next to the CP adding unit 41 shown in FIG. 3A. As shown in the figure, the symbol to which the guard interval is added is amplified to a proper power by a power amplifier after processes of digital analog conversion, frequency conversion and band limitation and the like by an RF transmission circuit, and the signal is transmitted via a duplexer and a transmit and receive antenna.

Although not essential for the present invention, antenna diversity reception is performed by two antennas when performing reception in the present embodiment. An uplink signal received by the two antennas are supplied to an uplink signal reception unit.

Figure 4A:
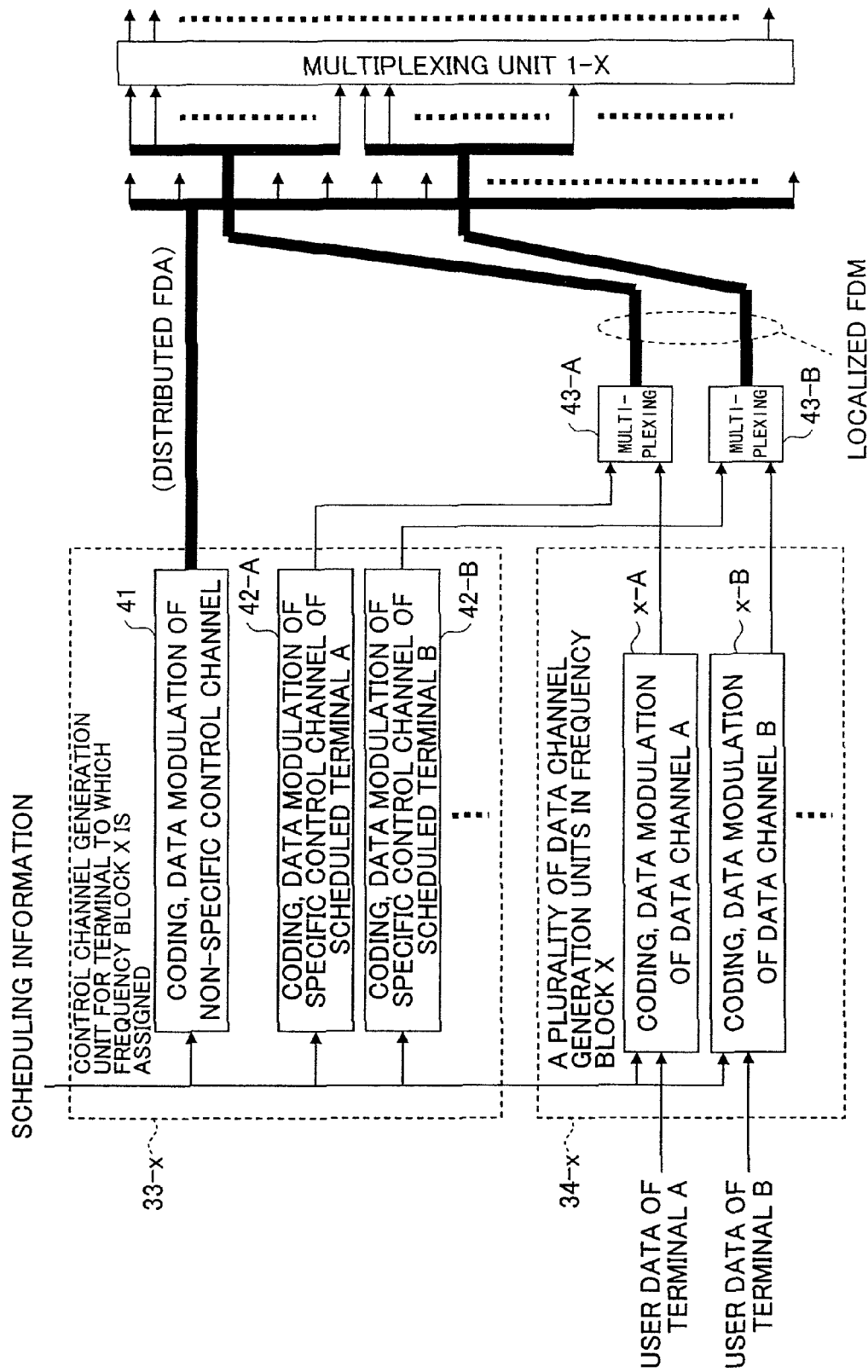
FIG. 4A is a diagram showing signal processing elements on one frequency block.

FIG. 4A shows signal processing elements on one frequency block (x-th frequency block). "x" is an integer equal to or greater than 1 and equal to or less than M. Generally, the figure shows a control signaling channel generation unit 33-x and a data channel generation unit 34-x relating to the frequency block x, multiplexing units 43-A and B, and a multiplexing unit 1-x. The control signaling channel generation unit 33-x includes a non-specific control channel generation unit 41 and one or more specific control channel generation units 42-A, B, . . . .

In the control signaling channel, the non-specific control channel generation unit 41 performs channel coding and multilevel modulation on a part of the non-specific control channel (that may be called non-specific control information) that every terminal using the frequency block should decode and demodulate, and outputs it.

Each of the specific control channel generation units 42-A, B, . . . performs channel coding and multilevel modulation on a part of the specific control channel (that may be called specific control information), in the control signaling channel, that a terminal to which one or more resource blocks is assigned in the frequency block should decode and demodulate, and outputs it.

The data channel generation units x-A, B, . . . perform channel coding and multilevel modulation on data channels addressed to individual terminals A, B, . . . , respectively. Information on the channel coding and multilevel modulation is included in the specific control channel.

The multiplexing unit (43-A, B, . . . ) associates the specific control channel and the data channel to a resource block for each terminal to which the resource block is assigned.

Figure 6:
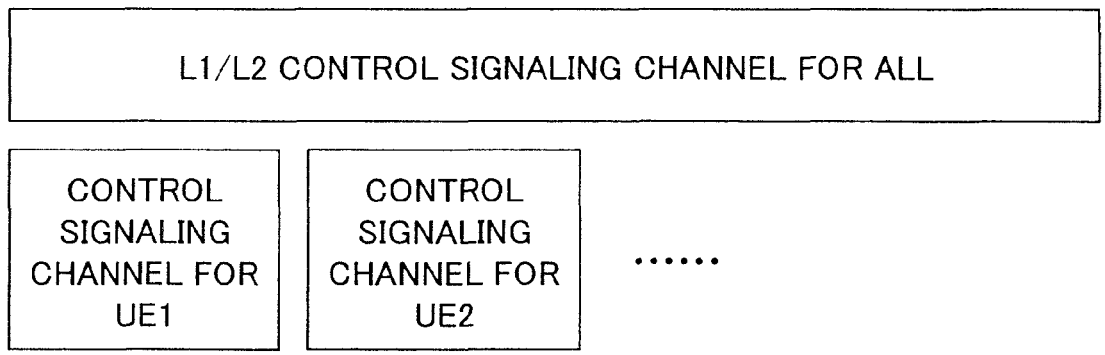
FIG. 6 is a diagram showing units of error correcting coding.

As mentioned above, coding (and modulation) for the non-specific control channel is performed in the non-specific control channel generation unit 41, and coding (and modulation) for the specific control channel is performed in the specific control channel generation units 42-A, B, . . . , individually. Therefore, in the present embodiment, as shown in FIG. 6 conceptually, the non-specific control channel includes pieces of information of all users to whom the frequency block x is assigned, and these pieces of information become a subject for error correcting coding on the whole.

In another embodiment, the non-specific control channel may be also error correcting coded for each user. In this case, since each user cannot uniquely specify which block includes its own information in blocks that are individually error correcting coded, it is necessary to decode all blocks. In this another embodiment, since coding processing is closed for each user, it is relatively easy to add and change users. Each user needs to decode and modulate non-specific control channels of all users.

On the other hand, the specific control channel only includes information on a user to which a resource block is actually assigned, so that error correcting coding is performed for each user. Which user is assigned a resource block is revealed by decoding and modulating the non-specific control channel. Therefore, it is not necessary that all user decode the specific control channel, and it is only necessary that a user to which a resource block is assigned perform decoding. By the way, a channel coding rate and a modulation scheme for the specific control channel are changed as necessary during communication, but a channel coding rate and a modulation scheme for the non-specific control channel may be fixed. However, it is desirable to perform transmission power control (TPC) for ensuring signal quality equal to or greater than a given level. The specific control channel is transmitted using a good resource block after error correcting coding is performed. Therefore, downlink data amount may be decreased to some extent by performing puncturing.

Figure 5C:
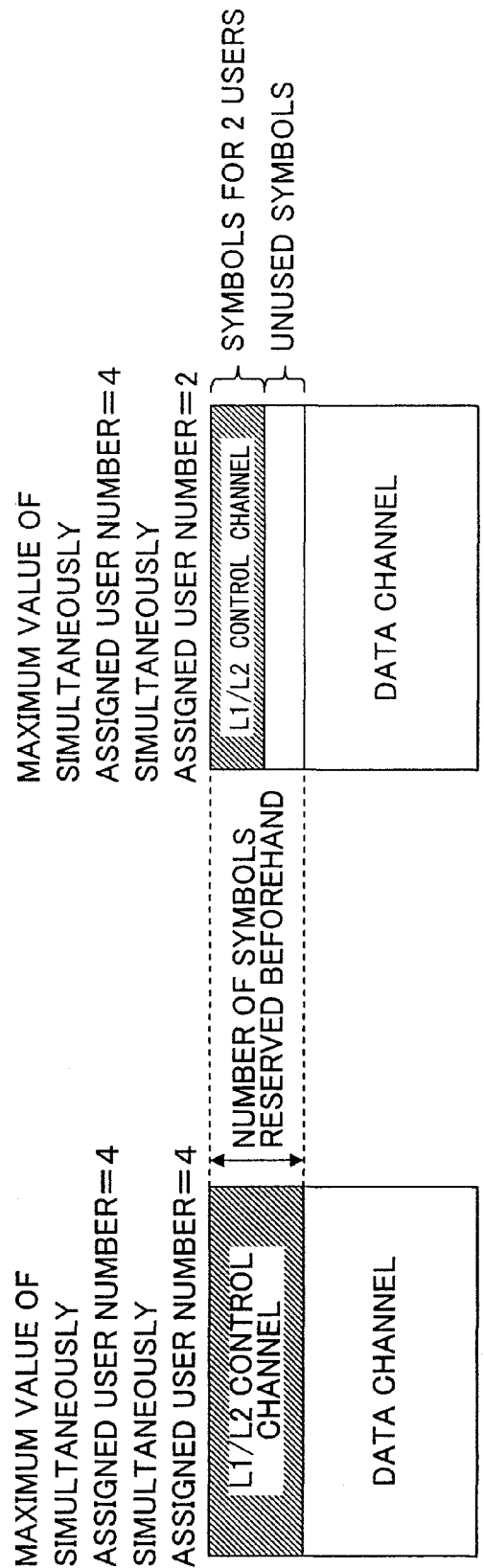
FIG. 5C is a diagram showing a L1/L2 control channel in which a number of symbols changes according to a number of simultaneously multiplexed users.

FIG. 5A shows an example of types and information items of downlink control signaling channels. The downlink control signaling channels include a broadcast channel (BCH), an individual L3 signaling channel (upper layer control channel or high layer control channel) and a L1/L2 control channel (low layer control channel). The L1/L2 control channel may include not only information for downlink data transmission but also information for uplink data transmission. In the following, outlines of information items transmitted by each channel are described.

(Broadcast Channel)

The broadcast channel is used for reporting unchanging information or information changing at a low speed in a cell to a communication terminal (that may be a mobile terminal or a fixed terminal, or may be called a user apparatus). For example, information that may change in a period of about 1000 ms (1 second) may be reported as broadcast information. The broadcast information may include a transmission format of a downlink L1/L2 control channel, a maximum number of users assigned simultaneously, resource block placement information and MIMO scheme information.

The transmission format is specified by a data modulation scheme and a channel coding rate. Instead of the channel coding rate, data size may be reported. This is because the channel coding rate can be uniquely derived from the data modulation scheme and the data size.

The maximum number of simultaneously assigned users indicates a maximum number that can be multiplexed in 1TTI using one or more of FDM, CDM and TDM. The number may be the same or may be different between the uplink channel and the downlink channel.

The resource block placement information is information for specifying positions of resource blocks on frequency and time axes used in the cell. In the present embodiment, as the frequency division multiplex (FDM) scheme, two kinds that are a localized FDM scheme and a distributed FDM scheme can be used. In the localized FDM scheme, continuous bands are locally assigned to a user in a good channel state on the frequency axis on a priority basis. This scheme is advantageous for communication of a user of small mobility, data transmission of high quality and high capacity, and the like. In the distributed FDM scheme, a downlink signal is generated so as to intermittently include a plurality of frequency components ranging over a wide band. This scheme is advantageous for communication of a user of large mobility, periodic data transmission of small data size such as voice packet (VoIP), and the like. Whether any scheme is used, resource assignment for frequency resources is performed according to information specifying continuous bands or a plurality of discrete frequency components.

As shown in the upper side of FIG. 5B, when a resource is specified by "4" in the localized FDM scheme, for example, a resource of the physical resource block number 4 is used. In the distributed FDM scheme shown in the lower side of FIG. 5B, when a resource is specified by "4", two left halves of physical resource blocks 2 and 8 are used. In the example shown in the figure, one physical resource block is divided into two. Numbering and the number of divisions in the distributed FDM scheme may different for each cell. Thus, resource block placement information is reported to communication terminals in the cell by the broadcast channel.

When a plurality of antennas are provided in a base station, MIMO scheme information indicates which is performed among a single user MIMO (SU-MIMO:Single User-Multi Input Multi Output) scheme or a multi user MIMO (MU-MIMO:Multi-User MIMO) scheme. The SU-MINO scheme is a scheme for communicating with one communication terminal having a plurality of antennas, and the MU-MIMO scheme is a scheme for communicating with a plurality of communication terminals each having one antenna simultaneously.

(Individual L3 Signaling Channel)

The individual L3 signaling channel is also used for reporting, to a communication terminal, information that changes at low speed such as in a period of 1000 ms, for example. Although the broadcast channel is sent to all communication terminals in the cell, the individual L3 signaling channel is sent only to a specific communication terminal. The individual L3 signaling channel includes a type of the FDM scheme and persistent scheduling information. The individual L3 signaling channel may be also classified to the specific control channel.

The type of the FDM scheme specifies which of the localized FDM scheme and the distribute FDM scheme is used for multiplexing the specified individual communication terminals.

The persistent scheduling information specifies, when persistent scheduling is performed, a transmission format (data modulation scheme and channel coding rate) of uplink or downlink data channel, a resource block to be used, and the like.

(L1/L2 Control Channel)

The downlink L1/L2 control channel may include not only information related to downlink data transmission but also information related to uplink data transmission. The former can be classified into part $0$, part $1$, part $2a$ and part $2b$. The part $1$ and the part $2a$ can be classified as the non-specific control channel, and the part $2b$ is classified as the specific control channel.

(Part $0$)

Part $0$ includes information indicating a transmission format of the L1/L2 control channel (modulation scheme and channel coding rate, and a number of simultaneously assigned users or a number of the whole control bits). When the transmission format of the L1/L2 control channel is reported by the broadcast channel, part $0$ may include the number of simultaneously assigned users (or the number of the whole control bits).

A number of symbols necessary for L1/L2 control channel depends on the number of simultaneously multiplexed users and reception quality of multiplexed users. As shown in the left side of FIG. 5C, the number of symbols of the L1/L2 control channel is set to be large enough typically. When changing the number of symbols, it can be controlled in a period of about 1000 ms (1 second), for example, according to the transmission format of the L1/L2 control channel reported by the broadcast channel. However, when the number of the simultaneously multiplexed users is small as shown in the right side of FIG. 5C, the number of symbols necessary for the control channel becomes small. Therefore, when the number of the simultaneously assigned users and the reception quality of the multiplexed users change in a short period, there is a case in which waste occurs in the L1/L2 control channel that is prepared large enough.

To decrease the waste of the L1/L2 control channel, the modulation scheme, the channel coding rate, and the number of simultaneously assigned users (or the number of the whole control bits) may be reported in the L1/L2 control channel. By reporting the modulation scheme and the channel coding rate in the L1/L2 control channel, the modulation scheme and the channel coding rate can be changed with a shorter period than that in reporting by the broadcast channel.

(Part $1$)

Part $1$ includes a paging indicator (PI). Each communication terminal demodulates the paging indicator so as to be able to check whether paging for the own terminal is performed.

(Part $2a$)

Part $2a$ includes resource assignment information of a downlink data channel, assigned time length, and MIMO information.

The resource assignment information of the downlink data channel specifies a resource block including the downlink data channel. Various methods known in this technical field can be used for specifying the resource block. For example, bit map scheme, tree branching number scheme and the like may be used.

The assignment time length indicates how long the downlink data channel is continuously transmitted. Changing the resource assignment content most frequently corresponds to changing it every TTI. From a viewpoint to decrease overhead, the data channel may be transmitted with same resource assignment content over a plurality of TTIs.

The MIMO information specifies, when the MIMO scheme is used for communication, a number of antennas, a number of streams, and the like. The number of streams may be called a number of information series.

By the way, although it is not essential that the part $2a$ include user identification information, the whole or a part of it may be included.

(Part $2b$)

Part $2b$ includes precoding information when the MIMO scheme is used, transmission format of the downlink data channel, hybrid retransmission control (HARQ) information and CRC information.

The precoding information when the MIMO scheme is used specifies weighting coefficients applied to each of a plurality of antennas. By adjusting the weighting coefficients applied to each antenna, directivity of a communication signal is adjusted.

The transmission format of the downlink data channel is specified by the data modulation scheme and the channel coding rate. Instead of the channel coding rate, data size or payload size may be reported. This is because the channel coding rate can be uniquely derived from the data modulation scheme and the data size.

The hybrid retransmission control (HARQ: Hybrid Automatic Repeat Request) information includes information necessary for retransmission control for downlink packets. More particularly, the retransmission control information includes process number, redundancy version information indicating packet combining method, and new data indicator for distinguishing between a new packet and a retransmission packet.

The CRC information indicates, when a cyclic redundancy check method is used for error detection, CRC detection bit in which user identification information (UE-ID) is convoluted.

Information related to uplink data transmission can be classified into 4 types from part $1$ to part $4$ as follows. Although these pieces of information may be classified to the non-specific control channel in principle, they may be transmitted as a specific control channel for a communication terminal to which resource is assigned for a downlink data channel.

(Part $1$)

Part $1$ includes transmission confirmation information for a past uplink data channel. The transmission confirmation information indicates acknowledgment (ACK) indicating that there is no error in the packet or that there is an error but it is in a permissible range, or indicates negative acknowledgment (NACK) indicating that there is an error exceeding a permissible range in a packet.

(Part 2)

Part 2 includes resource assignment information for a future uplink data channel, transmission format of the uplink data channel, transmission power information and CRC information.

The resource assignment information specifies a resource block that can be used for transmitting an uplink data channel. For specifying the resource block, various methods that are known in this technical field can be used. For example, bitmap scheme, tree branching number scheme, and the like may be used.

The transmission format of the uplink data channel is specified by the data modulation scheme and the channel coding rate. Instead of the channel coding rate, data size or payload size may be reported. This is because the channel coding rate can be uniquely derived from the data modulation scheme and the data size.

The transmission power information indicates how large a power by which the uplink data channel should be transmitted is.

The CRC information indicates, when a cyclic redundancy check method is used for error detection, CRC detection bit in which user identification information (UE-ID) is convoluted. By the way, in a response signal (downlink L1/L2 control channel) for a random access channel (RACH), a random ID of RACH preamble may be used as UE-ID.

(Part 3)

In part 3, a transmission timing control bit is included. This is a control bit for synchronizing the communication terminals in a cell.

(Part 4)

Part 4 includes transmission power information on transmission power of a communication terminal. This information indicates how large is a power which the communication terminal, to which a resource is not assigned for transmitting uplink data channel, should use for transmitting an uplink control channel for reporting CQI of a downlink channel, for example.

Figure 4B:
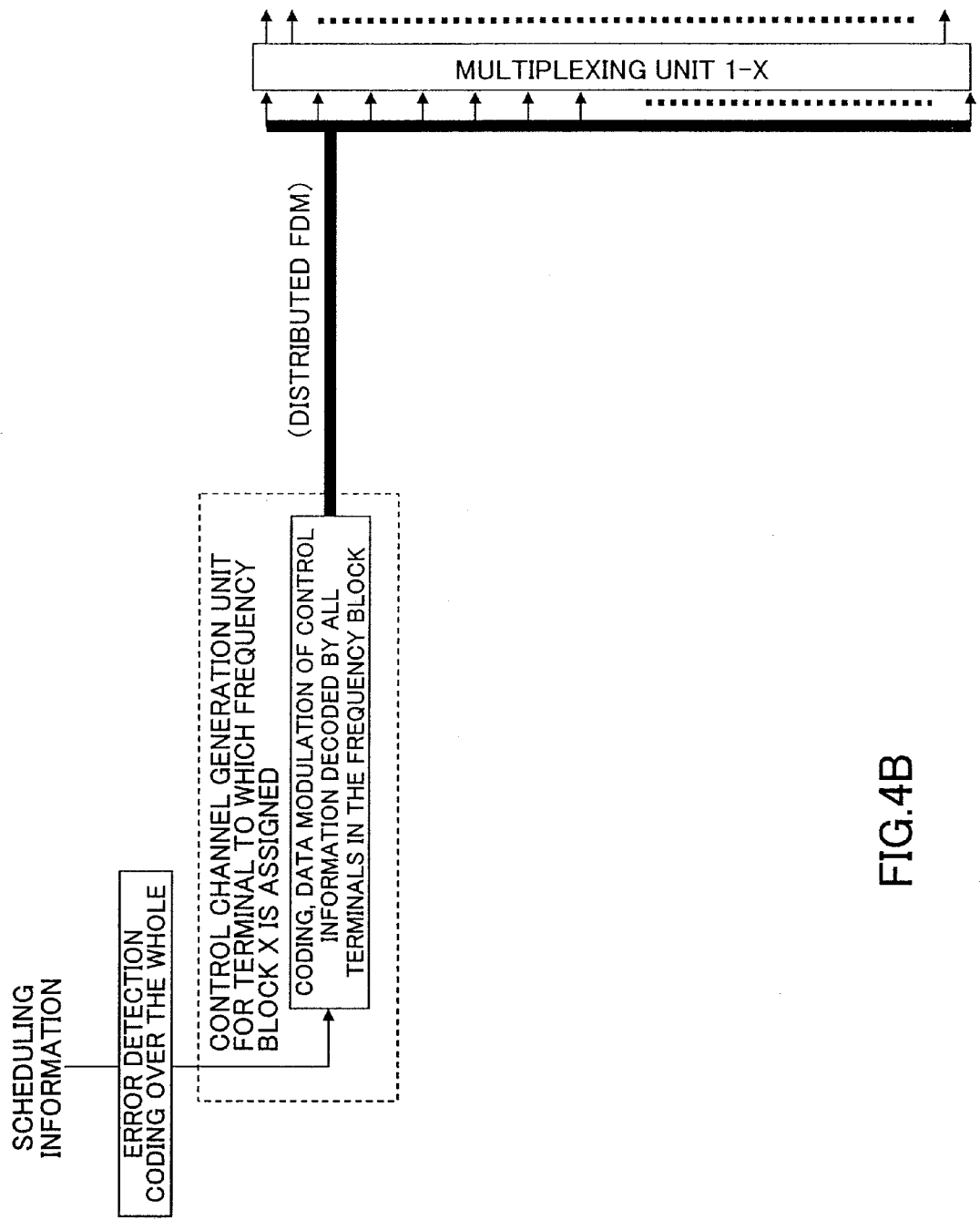
FIG. 4B is a diagram showing signal processing elements on a control channel.
Figure 4D:
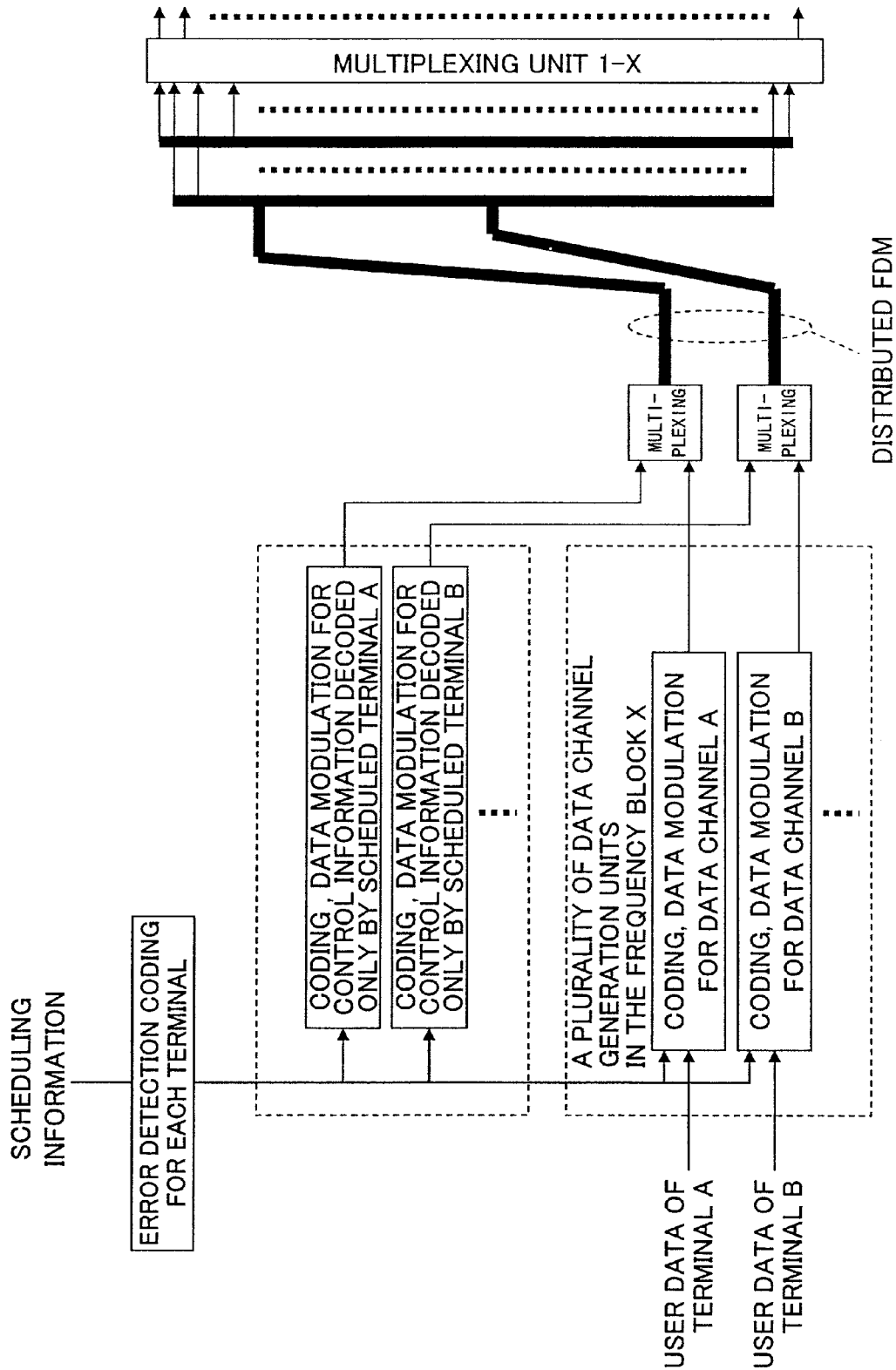
FIG. 4D is a diagram showing signal processing elements on a control channel.
Figure 4E:
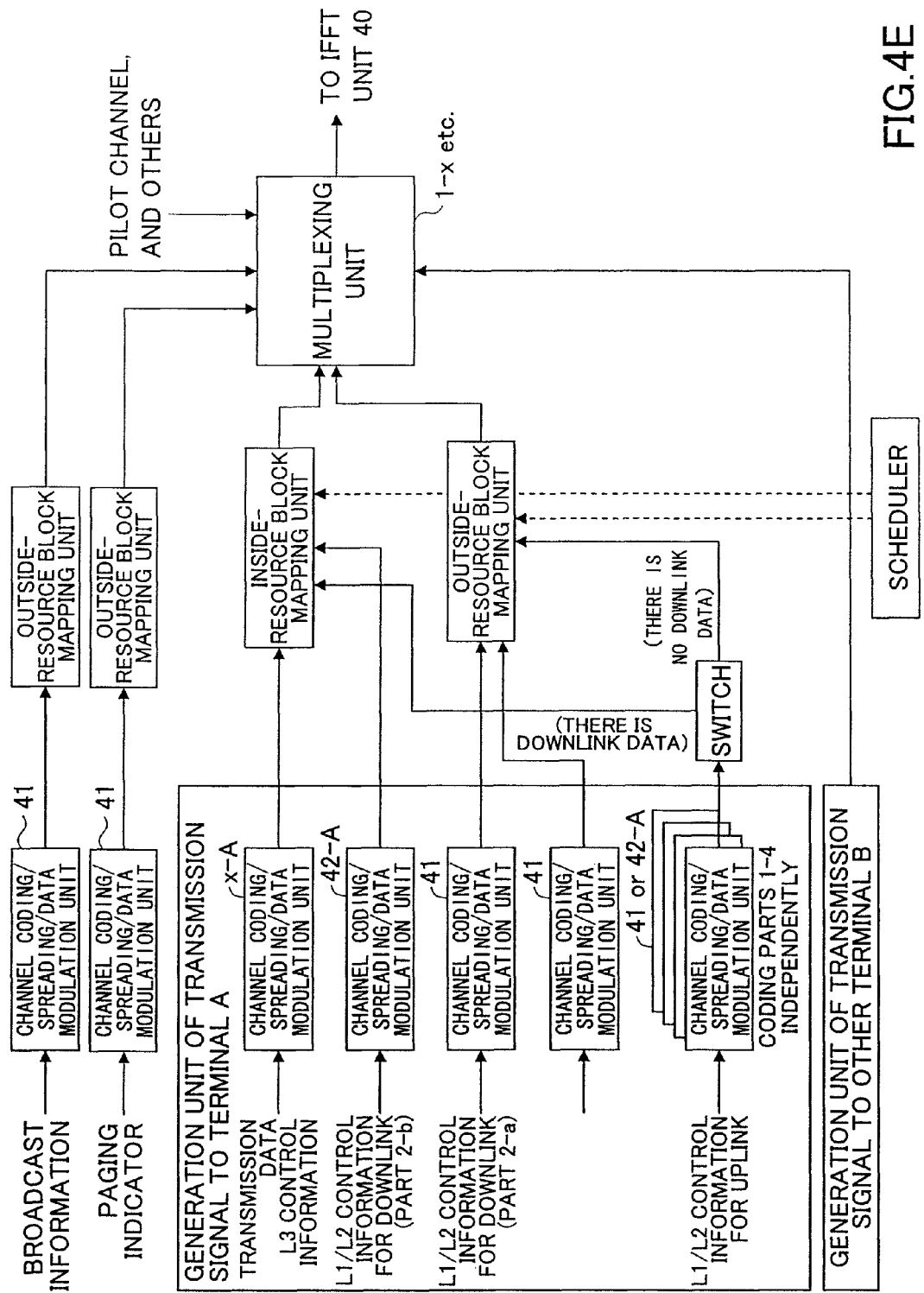
FIG. 4E is a diagram showing signal processing elements on one frequency block.

Similarly to FIG. 4A, FIG. 4E shows signal processing elements on one frequency block. But, it appears different from FIG. 4A in that it concretely shows respective pieces of control information. In FIGS. 4A and 4E, same reference symbols indicate same elements. In the figure, "mapping within resource block" indicates that mapping is performed being limited to one or more resource blocks assigned to a specific communication terminal. "Mapping outside resource block" indicates that mapping is performed over the whole region of the frequency block including many resource blocks. Information (parts 1-4) related to uplink data transmission in the L1/L2 control channel is transmitted, when a resource is assigned for a downlink data channel, using the resource as a specific control channel, and the information is transmitted, when the resource is not assigned, over the whole frequency block as a non-specific control channel.

FIG. 7A shows a mapping example of data channels and control channels. The mapping example shown in the figure is for one frequency block and for one subframe, and generally corresponds to output content of the first multiplexing unit 1-x (pilot channel and the like is multiplexed by the third multiplexing unit 38). One subframe may correspond to one transmission time interval (TTI), or correspond to a plurality of TTIs, for example. In the example shown in the figure, the frequency block includes seven resource blocks RB1-7. The seven resource blocks are assigned to terminals having a good channel state by the frequency scheduling unit 32 shown in FIG. 3A.

In general, the non-specific control channel and the like, the pilot channel and the like, and the data channel and the like are time multiplexed. The non-specific control channel is mapped all over the frequency block in a distributed manner. That is, the non-specific control channel is distributed all over the band occupied by seven resource blocks. In the example shown in the figure, the non-specific control channel and other control channels (excluding specific control channel) are frequency multiplexed. Other channels may include a synchronization channel and the like, for example (the non-specific control channel may be defined so as to include the synchronization channel and the like without differentiating between the non-specific control channel and the other control channels). In the example shown in the figure, the non-specific control channel and the other control channel are frequency multiplexed such that each includes a plurality of frequency components that are arranged at certain intervals. Such multiplexing scheme is called distributed frequency division multiplex (FDM) scheme. The intervals between the frequency components may be the same or may be different. In any case, it is necessary that the non-specific control channel is distributed over the whole range of one frequency block.

In the example shown in the figure, a pilot channel and the like is also mapped over the whole range of the frequency block. From the viewpoint of correctly performing channel estimation and the like for various frequency components, it is desirable that the pilot channel is mapped over a wide range as shown in the figure.

In the example shown in the figure, resource blocks RB1, RB2 and RB4 are assigned to a user 1 (UE1), resource blocks RB3, RB5 and RB6 are assigned to a user 2 (UE2), and a resource block RB7 is assigned to a user 3 (UE3). As mentioned above, such assignment information is included in the non-specific control channel. In addition, a specific control channel on the user 1 is mapped to the head of the resource block RB1 in the resource blocks assigned to the user 1. A specific control channel on the user 2 is mapped to the head of the resource block RB3 in the resource blocks assigned to the user 2. A specific control channel on the user 3 is mapped to the head of the resource block RB7 in the resource block assigned to the user 3. In the figure, it should be noted that sizes occupied by the specific control channel of the users 1, 2 and 3 are shown to be uneven. This indicates that information amount of the specific control channel may different according to users. The specific control channel is locally mapped limitedly to a resource block assigned to the data channel. In this point, this scheme is different from the distributed FDM in which mapping is performed over various resource blocks in a distributed manner. Such a mapping scheme is also called a localized frequency division multiplexing (localized FDM).

FIG. 7B shows another mapping example of the non-specific control channel. Although the specific control channel of the user 1 (UE1) is mapped only to one resource block RB1 in FIG. 7A, it is discretely mapped over the whole of the resource blocks RB1, RB2 and RB4 (the whole of the resource blocks assigned to user 1) in a distributed manner using the distributed FDM scheme. In addition, the specific control channel on the user 2 (UE2) is also different from the case shown in FIG. 7A, and it is mapped over the whole of the resource blocks RB3, RB5 and RB6. The specific control channel and the shared data channel of the user 2 are time division multiplexed. Accordingly, the specific control channel and the shared data channel of each user may be multiplexed using time division multiplexing (TDM) scheme and/or frequency division multiplexing scheme (including localized FDM scheme and distributed FDM scheme) in all or a part of one or more resource blocks assigned to the user. By mapping the specific control channel over equal to or greater than two resource blocks, frequency diversity effect can be expected also for the specific control channel, so that signal quality of the specific control channel can be further improved.

Next, concrete formats of the part 0 in the L1/L2 control channel are described.

FIG. 7C is an example showing formats of the L1/L2 control channel when reporting a number of symbols (or simultaneously assigned user number) of the L1/L2 control channel. When the communication terminal uses a modulation scheme and a coding rate (MCS: Modulation and Coding Scheme) reported by the broadcast channel, the number of symbols necessary for the L1/L2 control channel changes according to the number of simultaneously assigned users. For identifying it, control bits (two bits in FIG. 7C) are provided as information of the part 0 of the L1/L2 control channel. For example, by reporting control bits of 00 as information of the part 0, for example, the communication terminal can ascertain that the number of symbols of the L1/L2 control channel is 100 by decoding the control bits. By the way, the head two bits in FIG. 7C corresponds to the part 0, and variable control channel correspond to the non-specific control channel (corresponding to part 1 and part 2a in the case of downlink). In addition, although MCS is reported by the broadcast channel in FIG. 7C, MCS may be reported by a L3 signaling channel.

FIG. 7D is an example showing a format of the L1/L2 control channel when the number of simultaneously assigned users of each MCS is reported by part 0. When using a proper MCS from predetermined kinds of MCSes according to reception quality of the communication terminal, the number of symbols necessary for the L1/L2 control channel changes according to the reception quality of the communication terminal. For identifying this, control bits (eight bits in FIG. 7D) is provided as information of part 0 of the L1/L2 control channel. FIG. 7D shows a case, as an example, in which there are four kinds of MCSes and a maximum value of the number of simultaneously assigned users of each MCS is three. Since the number of simultaneously assigned users is 0-3, this information can be represented by two bits (00=0 user, 01=1 user, 10=2 users, 11=3 users). Since two bits are necessary for each MCS, part 0 becomes eight bits in this case. For example, by reporting control bits of 01100001 as information of the part 0, the communication terminal can ascertain control information (part 2a in the case of downlink) according to the own reception quality based on the control bits.

Figure 7E:
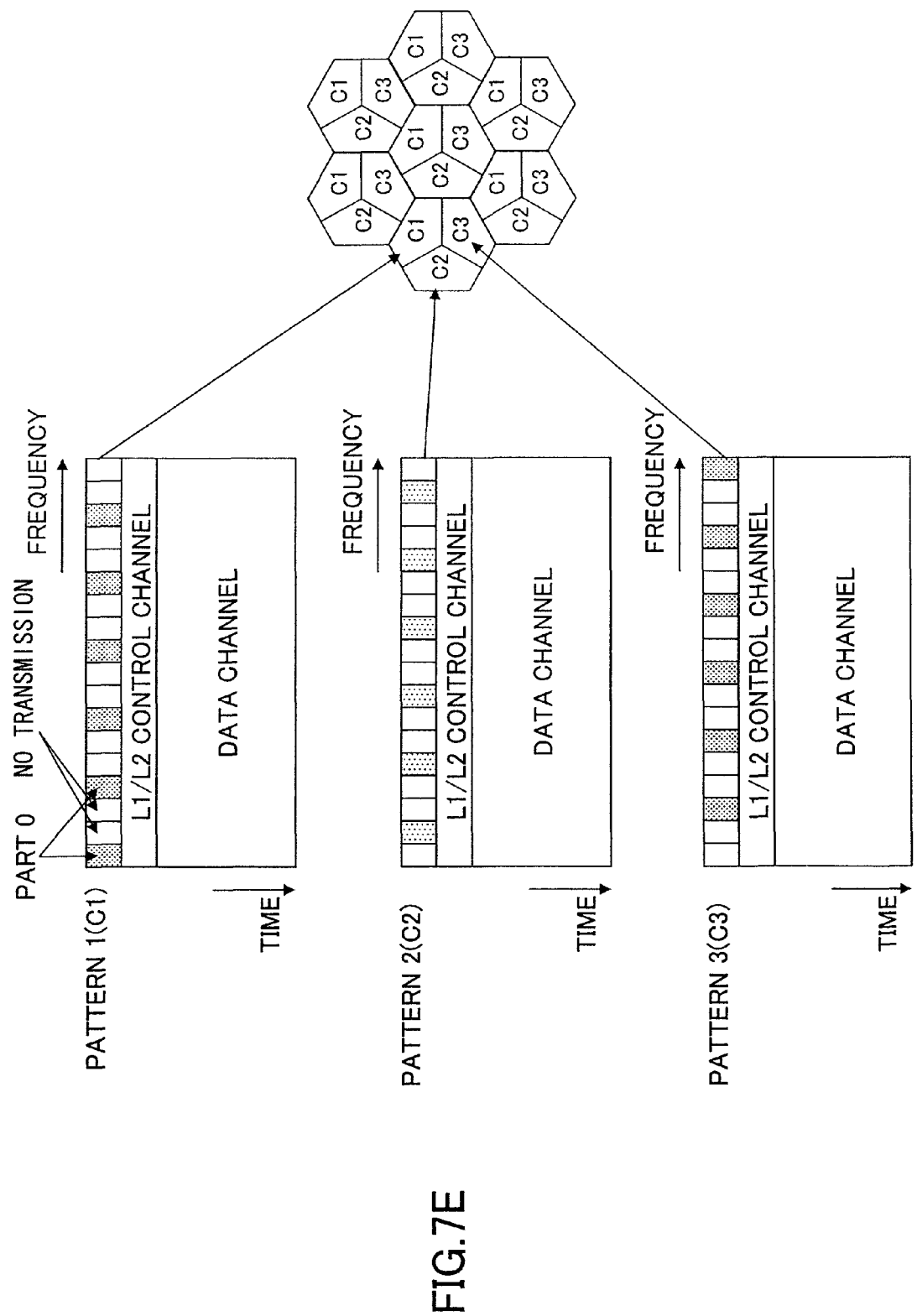
FIG. 7E is a diagram showing mapping examples of the L1/L2 control channel in a three sector configuration.

FIG. 7E is an example showing mapping of information bits (part 0) in the L1/L2 control channel in the case of three sector configuration. In the case of three sector configuration, three kinds of patterns may be prepared for transmitting the information bits (part 0) indicating a transmission format of the L1/L2 control channel, and assigned to each sector such that the patterns do not overlap in the frequency domain. By selecting a pattern such that transmission patterns in adjacent sectors (or cells) are different with each order, effect of interference coordination can be obtained.

Figure 7F:
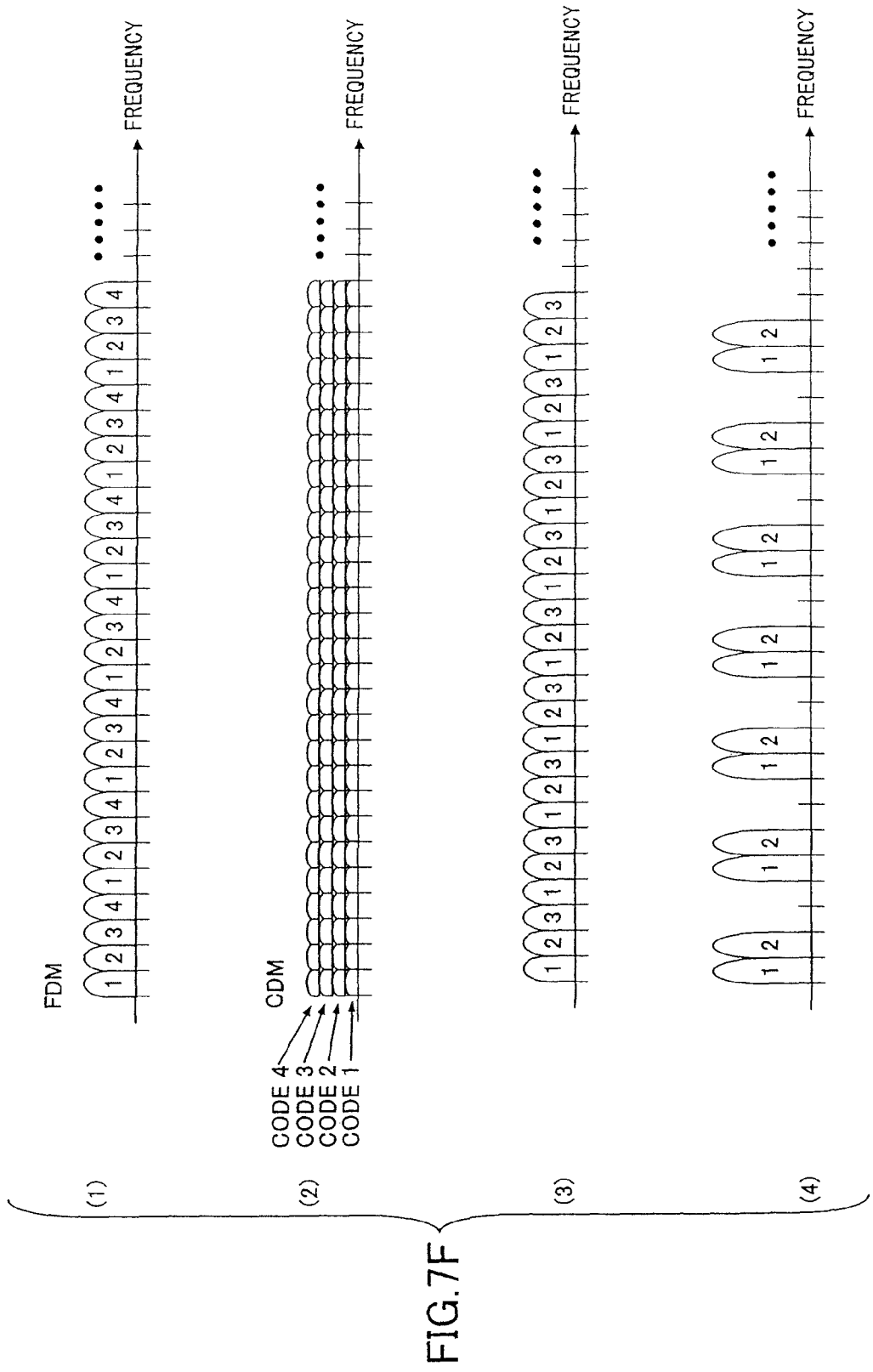
FIG. 7F is a diagram exemplary showing multiplexing schemes of a non-specific control channel.

FIG. 7F shows various examples of multiplexing methods. Although various non-specific control channels are multiplexed using the distributed FDM scheme in the above-mentioned examples, various proper multiplexing methods such as code division multiplexing scheme and time division multiplexing (TDM) scheme may be used. FIG. 7F(1) shows a case in which multiplexing is performed by the distributed FDM scheme. By using numbers 1, 2, 3 and 4 specifying a plurality of discrete frequency components, signals of each user can be properly orthogonalized. However, it is not necessary to be arranged regularly like this example. In addition, by using different rules between adjacent cells, interference amount when performing transmission power control can be randomized. FIG. 7F(2) shows a case in which multiplexing is performed by code division multiplexing (CDM) scheme. By using code 1, 2, 3 and 4, signals of each user can be properly orthogonalized. FIG. 7F(3) shows a case when the user multiplexing number changes to three in the distributed FDM scheme. By re-defining the numbers 1, 2 and 3 for specifying a plurality of discrete frequency components, signals of each user can be properly orthogonalized. When the number of simultaneously assigned users is less than the maximum number, as shown in FIG. 7F(4), the base station may increase transmission power of the downlink control channel. In addition, hybrid of CDM and FDM can be applied.

Figure 8A:
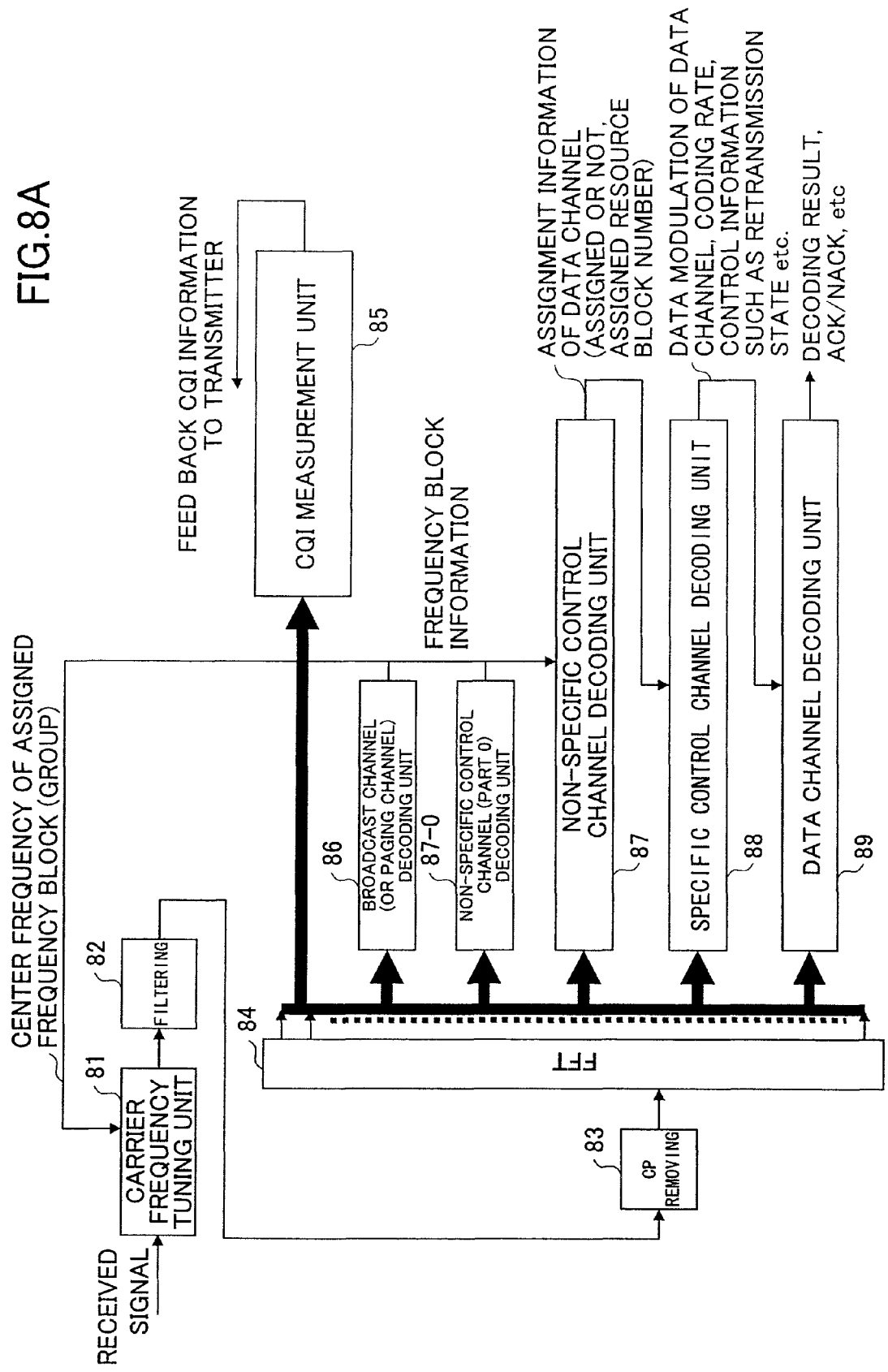
FIG. 8A shows a partial block diagram of a terminal used in an embodiment of the present invention.

FIG. 8A shows a partial block diagram of a mobile terminal used in an embodiment of the present invention. FIG. 8A shows a carrier frequency tuning unit 81, a filtering unit 82, a cyclic prefix (CP) removing unit 83, a fast Fourier transform unit (FFT) 84, a CQI measurement unit 85, a broadcast channel (or paging channel) decoding unit 86, a non-specific control channel (part 0) decoding unit 87-0, a non-specific control channel decoding unit 87, a specific control channel decoding unit 88 and a data channel decoding unit 89.

The carrier frequency tuning unit 81 properly adjusts a center frequency of a reception band so as to be able to receive a signal of a frequency block assigned to the terminal.

The filtering unit 82 filters a received signal.

The cyclic prefix removing unit 83 removes guard interval from a received signal to extract an effective symbol part from a received symbol.

The fast Fourier transform unit (FFT) performs fast Fourier transform on information included in the effective symbol to perform demodulation of the OFDM scheme.

The CQI measurement unit 85 measures a received power level of the pilot channel included in the received signal to feed the measurement result back to the base station as channel state information CQI. CQI is performed for each of all resource blocks in the frequency block, and all of them are reported to the base station.

The broadcast channel (or paging channel) decoding unit 86 decodes the broadcast channel.

When the paging channel is included, it is also decoded.

The non-specific control channel (part 0) decoding unit 87-0 decodes information of part 0 in the L1/L2 control channel. By the part 0, it becomes possible to recognize a transmission format of the non-specific control channel.

The non-specific control channel decoding unit 87 decodes the non-specific control channel included in the received signal to extract scheduling information. The scheduling information includes information indicating whether a resource block is assigned to a shared data channel addressed to the terminal, and information indicating a resource block number when it is assigned, and the like.

The specific control channel decoding unit 88 decodes a specific control channel included ion the received signal. The specific control channel includes information of data modulation, channel coding rate, and HARQ on the shared data channel.

The data channel decoding unit 89 decodes the shared data channel included in the received signal based on the information extracted from the specific control channel. According to the decoding result, acknowledgement (ACK) or negative acknowledgement (NACK) may be reported to the base station.

Figure 8B:
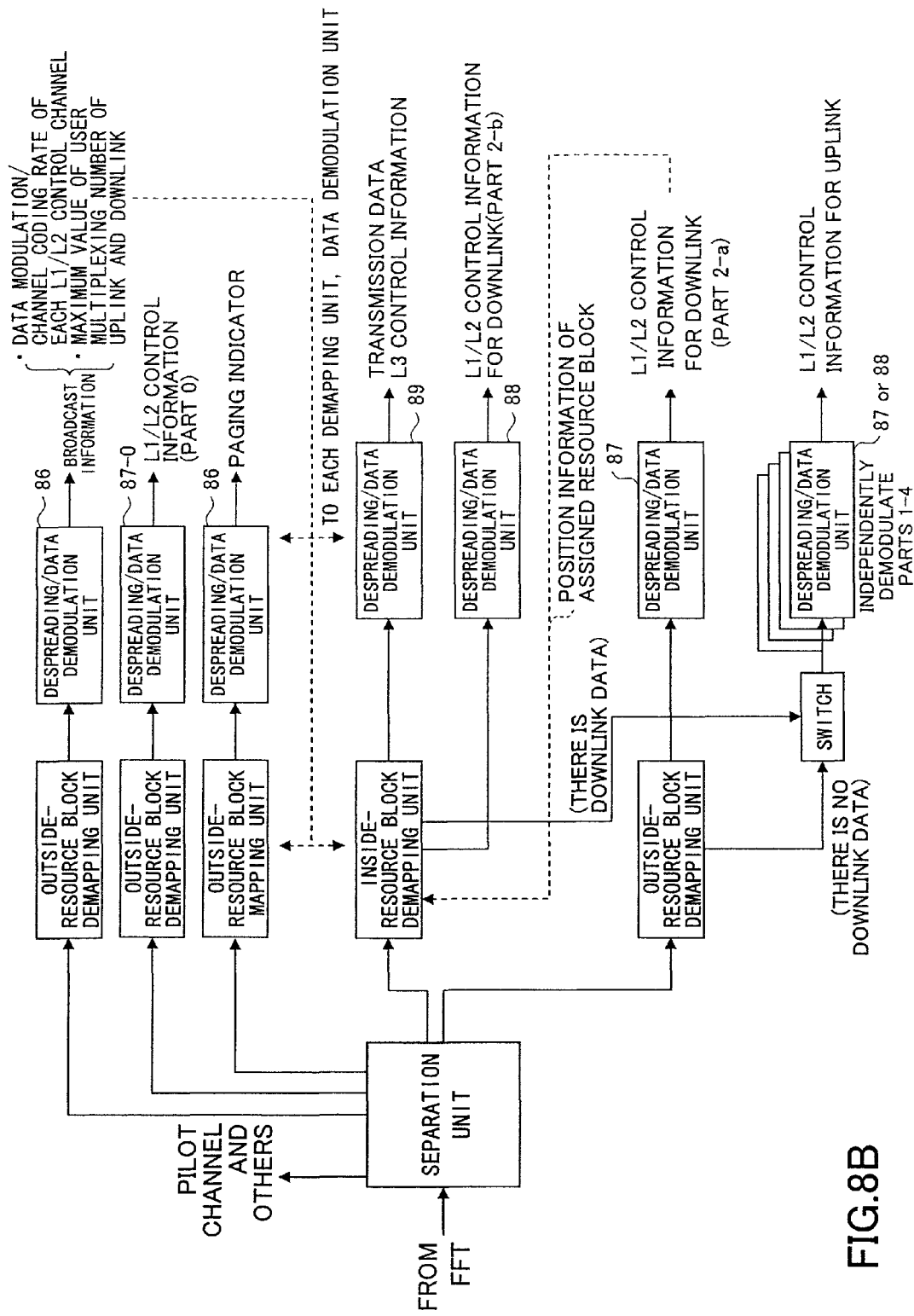
FIG. 8B shows a partial block diagram of a terminal used in an embodiment of the present invention.

FIG. 8B shows a partial block diagram of the mobile terminal like FIG. 8A, but, FIG. 8B looks different from FIG. 8A in that each pieces of control information are concretely shown. Same reference symbols indicate same elements in FIG. 8A and FIG. 8B. In the figure, "demapping within resource block" means extracting information that is mapped limitedly to one or more resource blocks assigned to a specific communication terminal. "Demapping outside resource block" means extracting information that is mapped over the whole of the frequency block including many resource blocks.

Figure 8C:
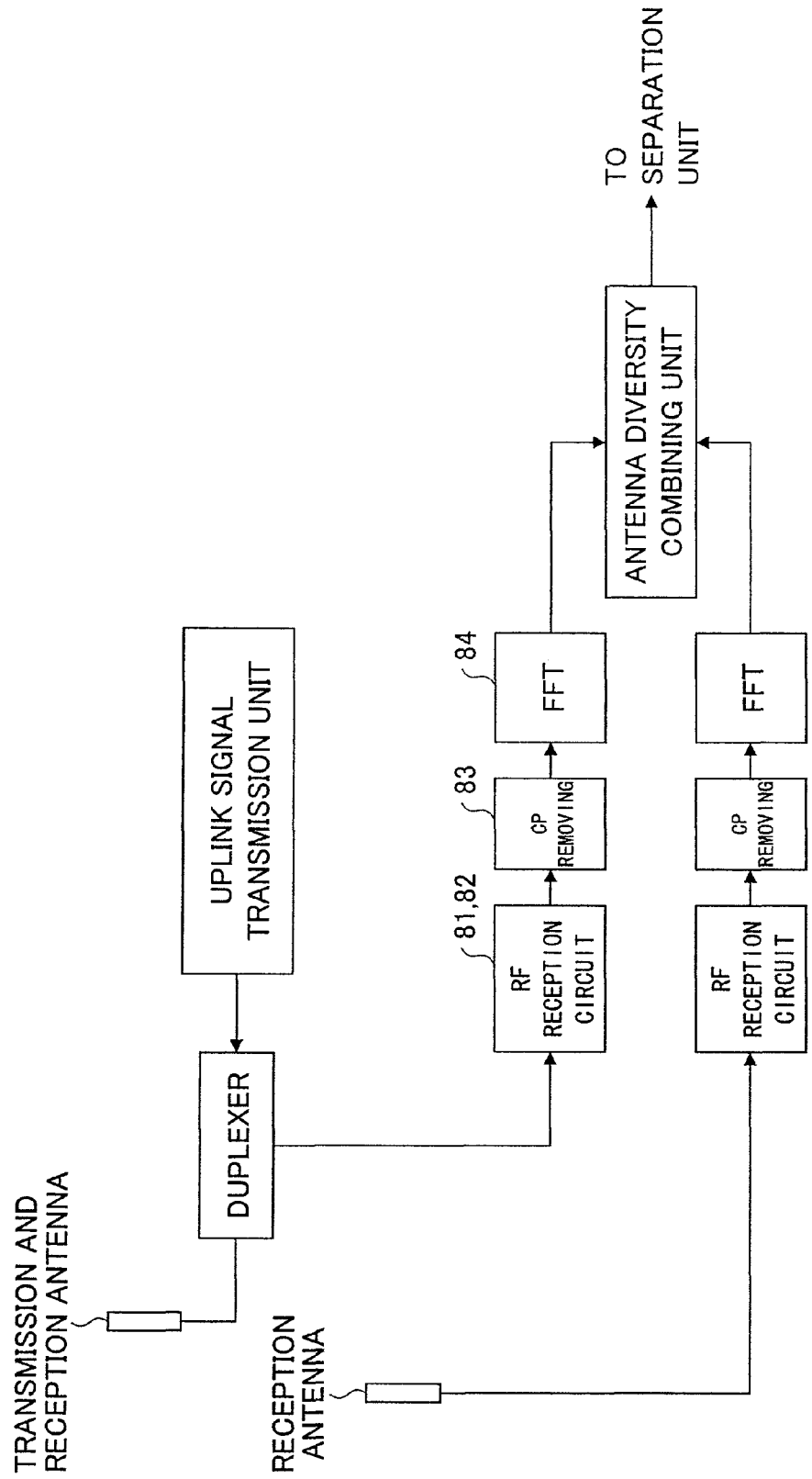
FIG. 8C shows a block diagram related to a reception unit of the terminal.

FIG. 8C shows elements related to a reception unit of FIG. 8A. Although not essential for the present invention, in the present embodiment, antenna diversity reception using two antennas is performed when performing reception. Downlink signals received by two antennas are supplied to RF reception circuits (81, 82) respectively, guard interval (cyclic prefix) is removed (83), and fast Fourier transform is performed (84). Signals received by each antenna are combined by an antenna diversity combining unit. A signal after combining is supplied to each decoding unit shown in FIG. 8A or to a separation unit shown in FIG. 8B.

FIG. 9 is a flowchart showing an operation example according to an embodiment of the present invention. As an example, assuming that a user having a mobile terminal UE1 that can perform communication using a bandwidth of 10 MHz enters a cell or a sector in which communication is performed using a bandwidth of 20 MHz. It is assumed that the minimum frequency band of the communication system is 5 MHz, and that the whole band is divided into four frequency blocks 1-4 as shown in FIG. 2.

In step S11, the terminal UE1 receives a broadcast channel from the base station, and checks which frequency block the own terminal can use. The broadcast channel may be transmitted using a band of 5 MHz including a center frequency of the whole band of 20 MHz. Accordingly, any terminals in which bandwidths that can be received are different can receive the broadcast channel easily. The broadcast channel permit the user that performs communication using the bandwidth of 10 MHz to use a combination of two adjacent frequency blocks such as frequency blocks (1, 2), (2, 3) or (3, 4). All of these may be permitted to use, or use may be restricted to any of the combinations. As an example, it is assumed that frequency blocks 2 and 3 are permitted to use.

In step S12, the terminal UE1 receives a downlink pilot channel to measure received signal quality for the frequency blocks 2 and 3. The measurement is performed for each of the many resource blocks included in each frequency block, so that all of these are reported to the base station as channel state information CQI.

In step S21, the base station performs frequency scheduling for each frequency block based on the channel state information CQI reported from the terminal UE1 and other terminals. It is checked and managed by the frequency block assignment control unit (31 in FIG. 3A) that a data channel addressed to the UE1 is transmitted from the frequency block 2 or 3.

In step S22, the base station generates a control signaling channel for each frequency block according to scheduling information. The control signaling channel includes the non-specific control channel and the specific control channel.

In step S23, the control channel and the shared data channel are transmitted from the base station for each frequency block according to the scheduling information.

In step S13, the terminal UE1 receives a signal transmitted by the frequency blocks 2 and 3.

In step S14-0, the terminal UE1 recognizes a transmission format of the non-specific control channel from part 0 of the control channel received by the frequency blocks 2 and 3.

In step S14, the terminal separates the non-specific control channel from the control channel received by the frequency block 2, decodes it to extract scheduling information. Similarly, the terminal separates the non-specific control channel from the control channel received by the frequency block 3, decodes it to extract scheduling information. Any scheduling information includes information indicating whether a resource block is assigned to a shared data channel addressed to the terminal UE1, and includes information indicating a resource block number when it is assigned, and the like. When any resource block is not assigned to the shared data channel addressed to the own terminal, the terminal UE1 returns to waiting state to wait for receiving the control channel. When any resource block is assigned to the shared data channel addressed to the own station, the terminal UE1 separates the specific control channel included in the received signal and decodes it in step S15. The specific control channel includes information of data modulation on the shared data channel, channel coding rate and HARQ.

In step S16, the terminal UE1 decodes the shared data channel included in the received signal based on information extracted from the specific control channel. Acknowledgment (ACK) or negative acknowledgement (NACK) may be reported to the base station according to the decoding result. After that, similar procedure is repeated.

Embodiment 2

In the first embodiment, the control channel is classified to the specific control channel that the terminal to which resource block is assigned should decode and demodulate and classified to others, and the specific control channel is mapped limitedly to the assigned resource block, and other control channel is mapped over the whole frequency band. Accordingly, for the control channel, transmission efficiency can be improved and the quality can be heightened. However, the present invention is not limited to such transmission method examples.

Figure 7G:
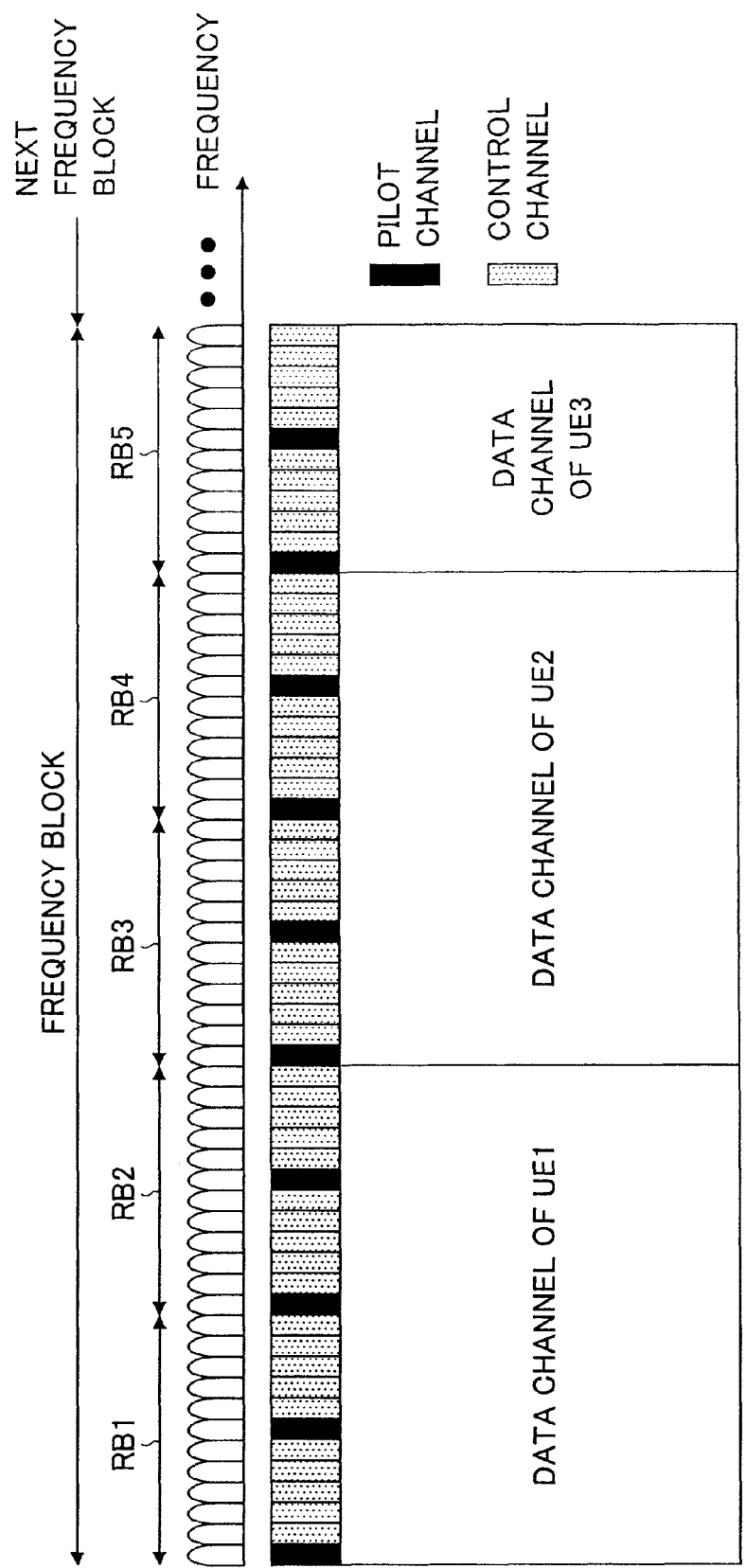
FIG. 7G is a diagram showing a mapping example of data channels and control channels.

FIG. 7G is a figure showing a mapping example of data channels and control channels according to the second embodiment of the present invention. Also in the present embodiment, a base station shown in FIG. 3 is used. In this case, process elements shown in FIG. 4B are mainly used with respect to the control channel. In the present embodiment, specific control information and non-specific control information are not clearly distinguished, and they are transmitted using the whole region of the frequency band over a plurality of resource blocks. As shown in FIG. 4B, in the present embodiment, error correcting coding is performed on the whole of the control channel for a plurality of users as a processing unit. The user apparatus (mobile station, typically) decodes and demodulates the control channel, determines whether the own station is assigned, and recovers the data channel transmitted by a specific resource block according to channel assignment information.

For example, assuming that control information of 10 bits are transmitted for each of the first to third users UE1, UE2 and UE3 to which resource blocks are assigned. The whole of the control information of 30 bits for the three are error correcting coded as a processing unit. When the coding rate (R) is ½, 30×2=60 bits are generated and transmitted. On the other hand, different from the present embodiment, it can be considered to perform error correcting coding and transmit each of control information. In that case, control information of 10 bits for one user is error correcting coded, 10×2=20 bits are generated, and they are prepared for the three (60 bits in total). The amount of control information to be transmitted becomes 60 bits for either case. But, according to the present embodiment, since the processing unit of error correcting coding is three times longer than the other one, it is advantageous in terms of increasing coding gain (that is, making it harder to cause error). Further, error detection bits (CRC bits and the like) are added to the whole of the 60 bits in the present embodiment, but, when performing error correcting coding for each user, error detection bits are added for every 20 bits. Therefore, also from the viewpoint of suppressing increase of overhead due to detection bits, the present embodiment is advantageous.

Embodiment 3

FIG. 7H is a figure showing a mapping example of data channels and control channels according to the third embodiment of the present invention. Also in the present embodiment, a base station shown in FIG. 3 is used, but, as to the control channel, process elements shown in FIG. 4C are mainly used. Also in the present embodiment, although specific control information and non-specific control information are not clearly distinguished, the control channel is mapped limitedly to a resource block assigned to a user that should receive the control channel. For example, a control channel of a first user UE1 is mapped to first and second resource blocks RB1 and RB2, a control channel of a second user UE2 is mapped to third and fourth resource blocks RB3 and RB4, and a control channel of a third user UE3 is mapped to a fifth resource block RB5. Error correcting coding is performed for each user. This point is different from the second embodiment in which the control channel of the first to third users are error correcting coded and mapped to resource blocks RB1-RB5 as a whole.

In the present embodiment, the control channel and the data channel are limited to same resource blocks, but which resource block is assigned to a mobile station is unknown for the mobile station before receiving the control channel. Therefore, it is necessary that each mobile station should receive all resource blocks to which the control channel can be mapped so as to demodulate not only the control channel of the own station but also control channels of other stations. In the example shown in FIG. 7H, the first user UE1 demodulates the control channels mapped to all of the resource blocks RB1-RB5 to be able to know that the own station is assigned to first and second resource blocks RB1 and RB2.

In the second embodiment, transmission power of the base station is determined for a user in the worst environment such that the user in the worst communication environment can receive the control channel with a required quality. Therefore, it becomes excessive quality for users that are not in the worst communication environment so that the base station always needs to consume surplus power. However, in the third embodiment, since processing such as error correcting coding and transmission band is limited to resource blocks of each user, transmission power control can be also performed for each user. Therefore, it becomes unnecessary to consume redundant power in the base station. In addition, since the resource block is assigned to a user in a good channel state, the control channel is transmitted in such a good channel state so that quality of the control channel can be improved.

Embodiment 4

Figure 7I:
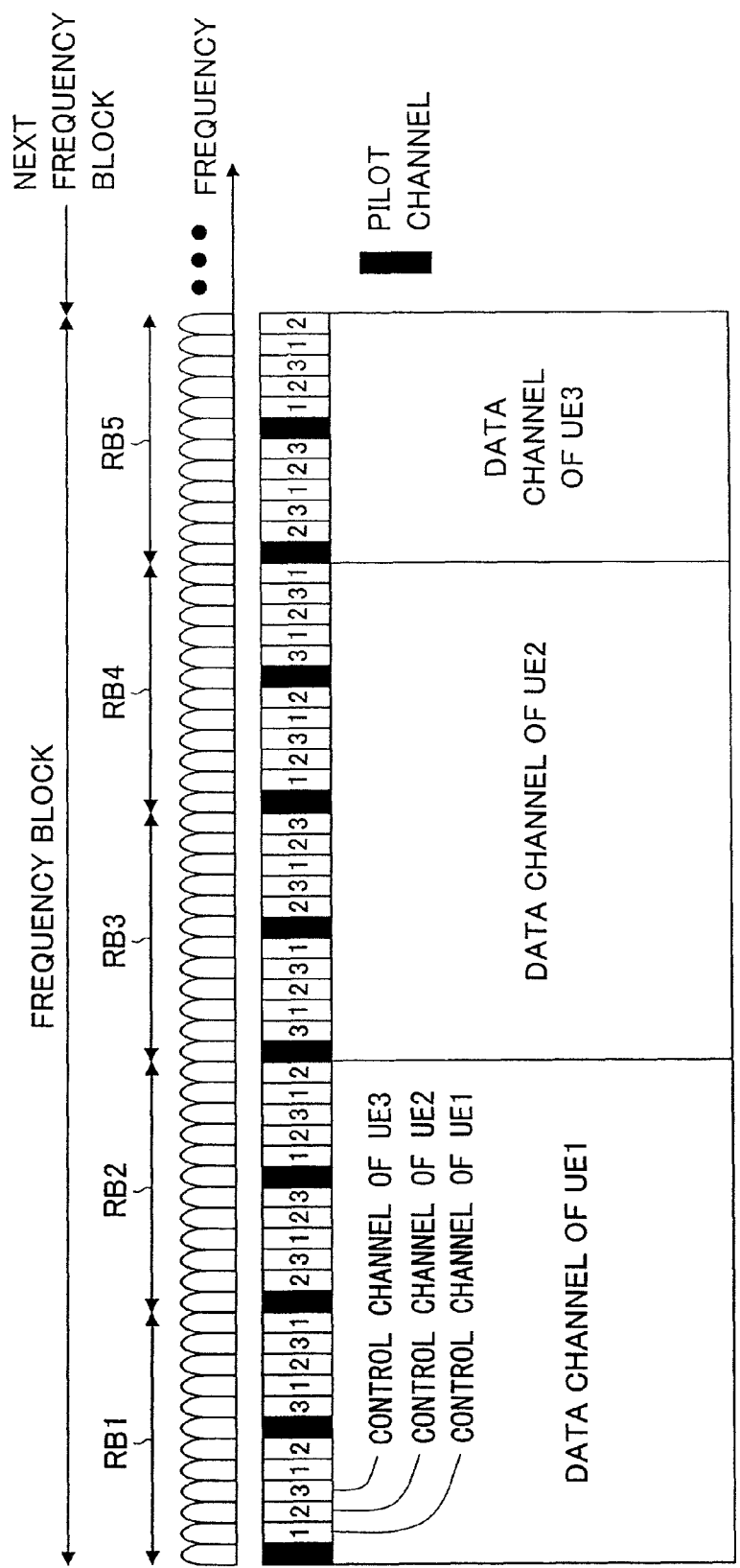
FIG. 7I is a diagram showing a mapping example of data channels and control channels.

FIG. 7I is a figure showing a mapping example of data channels and control channels according to a fourth embodiment of the present invention. Also in the present embodiment, a base station shown in FIG. 3 is used, but, process elements on the control channel become those shown in FIG. 4C. Also in the present embodiment, although specific control information and non-specific control information are not clearly distinguished, the control channel is error correcting coded for each user so that transmission power is determined like the third embodiment. However, the control channel is not only mapped to resource blocks assigned to a user that should receive the control channel but also mapped to other resource blocks in a distributed manner. Also in this manner, the control channel can be transmitted.

By the way, in the first to fourth embodiments, when mapping the control channel to a plurality of resource blocks in a distributed manner, it is not essential to map the control channel into all of the resource blocks in a given frequency band. For example, the control channel may be mapped only to odd-numbered resource blocks RB1, RB3, . . . in the given frequency band, or may be mapped only to even-numbered resource blocks. The control channel may be mapped limitedly to any proper resource blocks known between the base station and the mobile station. Accordingly, search range used when the mobile station extracts assignment information of the own station can be properly narrowed.

Embodiment 5

As mentioned above, in the second embodiment, transmission power of the base station is determined for a user in the worst communication environment so that the base station should always consume surplus power. However, if communication environments of many users are similarly good, such fear can be overcome. Therefore, in a communication environment in which comparable quality can be obtained for a plurality of users, the method described in the second embodiment is advantageous. From this viewpoint, in the fifth embodiment of the present invention, user apparatuses in a cell are properly grouped and use frequency band is divided for each group.

Figure 7J:
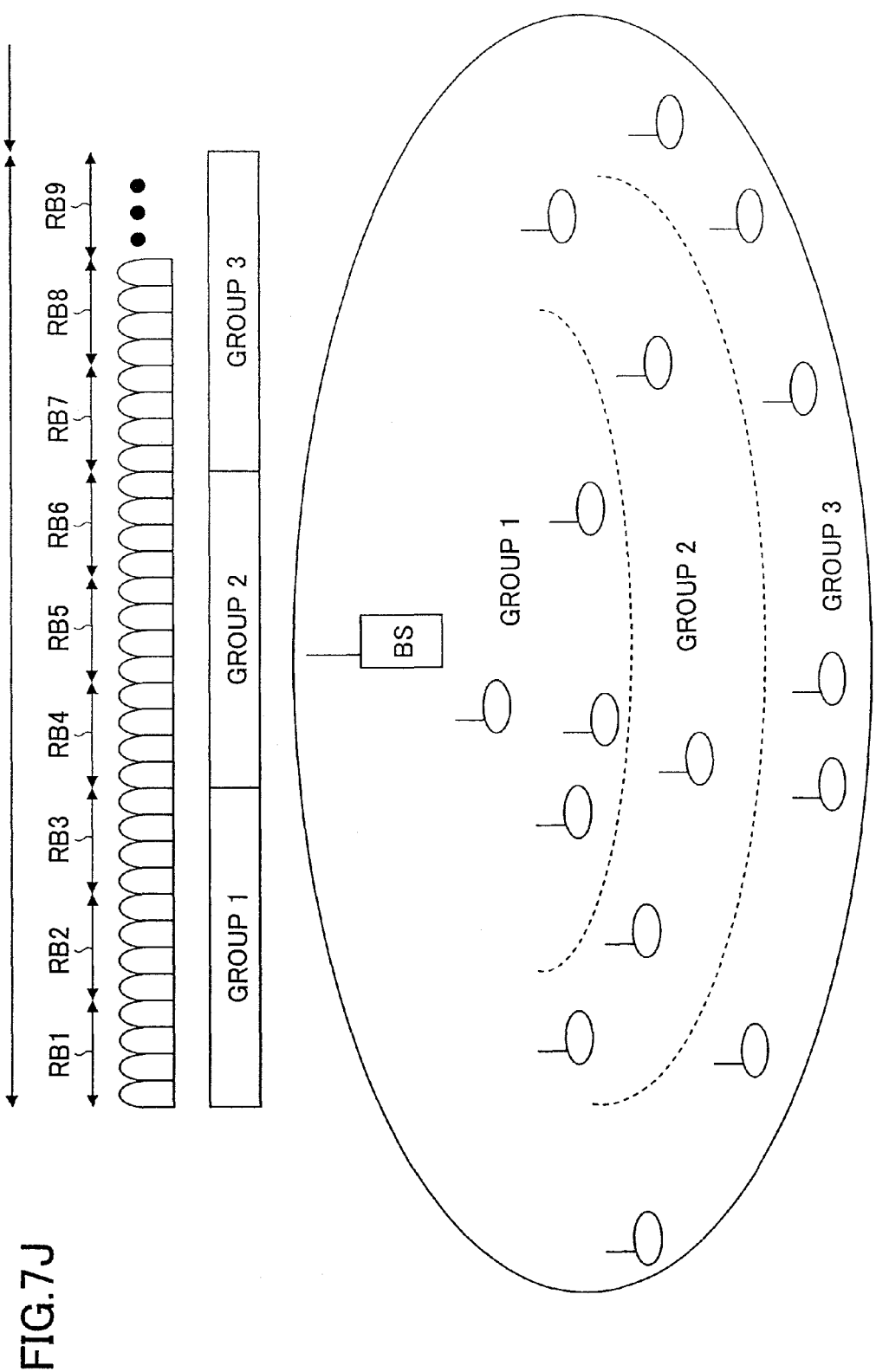
FIG. 7J is a diagram showing a manner for grouping users in a cell.

FIG. 7J shows a schematic diagram for explaining the fifth embodiment of the present invention. In the example shown in the figure, three groups are prepared according to a distance from the base station, in which resource blocks RB1-RB3 are assigned to the group 1, resource blocks RB4-RB6 are assigned to the group 2, and resource blocks RB7-RB9 are assigned to the group 3. The prepared number of groups and the number of resource blocks are merely examples, and any proper number may be used. After being grouped, each of the various methods described in the first to fourth embodiments may be performed. By grouping the users and frequency bands, difference of reception quality among users can be decreased. Accordingly, the problem (problem feared in the second embodiment) that surplus amount of transmission power is consumed in the base station due to the user in the worst environment can be effectively addressed. In addition, also in the third embodiment, by performing grouping like the present embodiment, transmission powers of control channels become comparable in the same group, so that it becomes advantageous from the viewpoint for stabilizing operation of a base station transmitter, and the like.

In the example shown in the figure, for the sake of simplifying the explanation, three groups are prepared according to the distance from the base station. However, grouping can be performed not only based on the distance but also based on channel quality indicator (CQI). CQI may be measured as any proper amount that is known to this technical field such as SIR and SINR and the like.

Embodiment 6

The non-specific control channel (including part 0) is information necessary for all users, and the data channel is decoded based on the non-specific control channel. Thus, error detection (CRC) coding and channel coding are performed on the non-specific control channel. In the sixth embodiment of the present invention, concrete examples of the error detection coding and the channel coding are explained. FIG. 4E is a figure corresponding to a configuration in which channel coding is performed on L1/L2 control information (part 0) and L1/L2 control information (part 2a and 2b) separately (including coding/spreading/data modulation units 41, 42-A for each control information). In the following, alternative configurations of this are described.

Figure 10A:
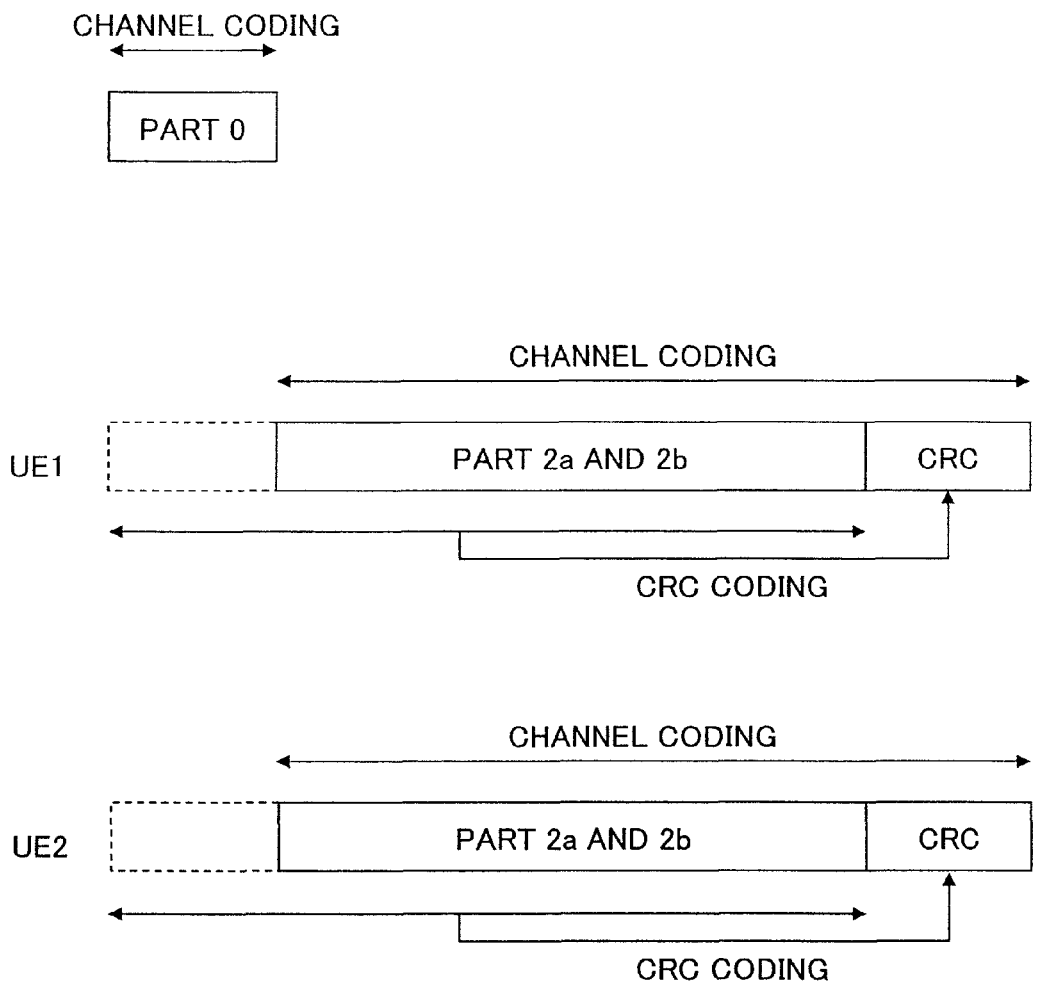
FIG. 10A is a diagram showing relationship between subjects of error check and channel coding units.

FIG. 10A shows a case in which part 0 and parts 2a and 2b are error detection coded as a whole, and, part 0, and parts 2a and 2b are separately channel coded. Communication terminals UE1 and UE2 perform error detection for the part 0, and parts 2a and 2b as a whole, and use a L1/L2 control channel for the own communication terminal from parts 2a and 2b based on the part 0.

Since error detection (CRC) code may become larger than control bits of part 0, in this case, overhead of error detection coding can be decreased.

Figure 10B:
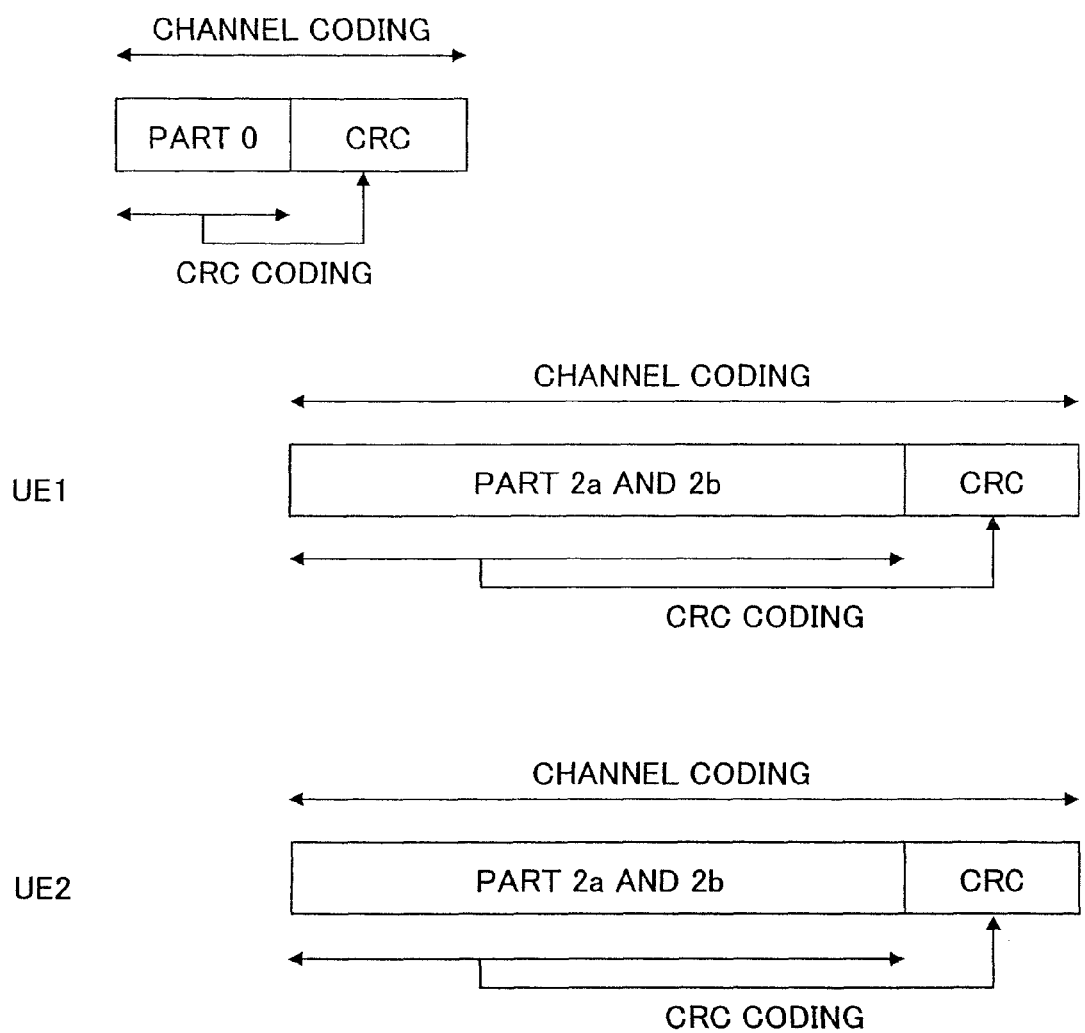
FIG. 10B is a diagram showing relationship between subjects of error check and channel coding units.

FIG. 10B indicates a case in which part 0, and, parts 2a and 2b are separately error detection coded, and part 0, and, parts 2a and 2b are separately channel coded. Although the overhead becomes larger compared with the case of FIG. 10A, there is an advantage in that, when error detection for part 0 fails, it becomes unnecessary to perform processing for parts 2a and 2b.

Figure 10C:
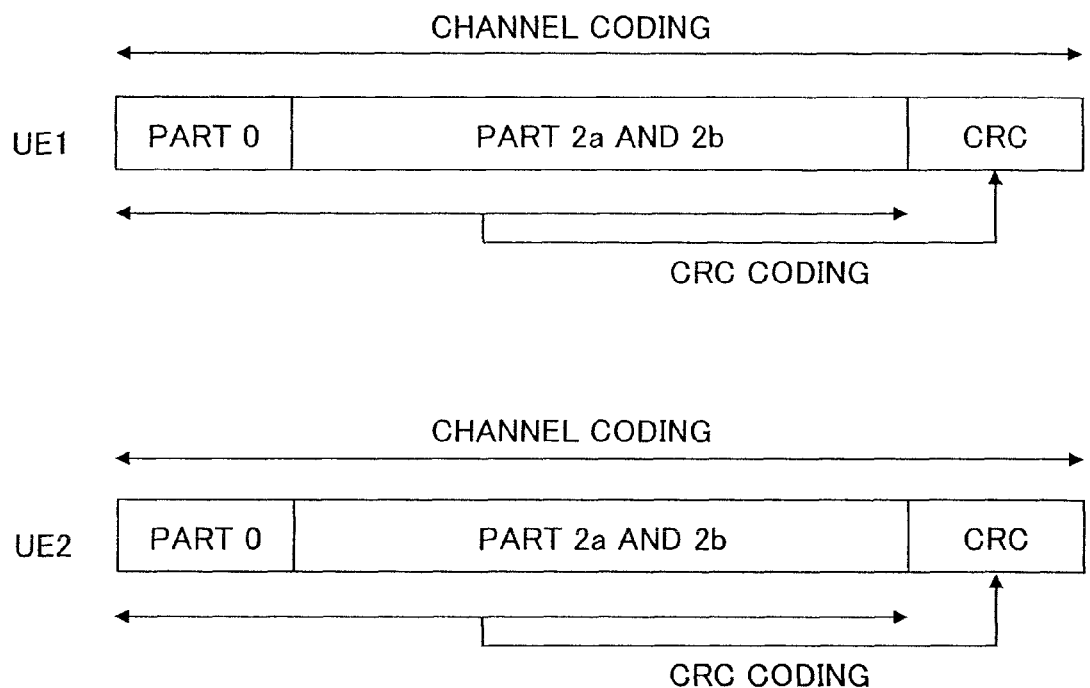
FIG. 10C is a diagram showing relationship between subjects of error check and channel coding units.

FIG. 10C shows a case in which part 0 and parts 2a and 2b are error detection coded as a whole, and part 0 and parts 2a and 2b are channel coded as a whole. In this case, although information of part 0 cannot be extracted unless part 0 and parts 2a and 2b are decoded together, there is an advantage in that efficiency of channel coding rate increases.

In FIGS. 10A-10C, although error detection coding and channel coding for part 0 and part 2a and 2b are described, they can be similarly applied to non-specific control channels other than the parts 2a and 2b.

Embodiment 7

FIG. 10D shows a method example for decreasing information amount of uplink data transmission related information. In step S1, a downlink L1/L2 control channel is transmitted from the base station. As mentioned before (especially, as described being related to FIG. 7F), a plurality of pieces of control information for a plurality of communication terminals are multiplexed and transmitted (assuming that the user multiplexing number is N, for the sake of convenience). Each communication terminal demodulates a plurality of L1/L2 control channels addressed to own and other communication terminals. For example, it is assumed that a control channel including UE-ID of own terminal is mapped to a X-th position in N. In this case, the user apparatus performs demodulation N times at most so as to find out a non-specific control channel addressed to the own apparatus mapped to the X-th position, and ascertain assignment content (which resource block can be used for the own terminal, and the like) of the own terminal based on assignment information included in that.

In step S2, using the assigned RB that is assigned, a packet (t=TTI1) of uplink is transmitted to the base station, for example. "t=TTI1" indicates time.

In step S3, the base station receives the uplink data channel D(t=TTI1), decodes it to determine presence or absence of an error. The determination result is represented by ACK or NACK. The base station should report the determination result to the source communication terminal. The base station reports the determination result to the communication terminal using the L1/L2 control channel. This determination result (transmission confirmation result) belongs to part 1 of the uplink data transmission related information according to the classification of FIG. 5A. Since the base station also receives uplink channels from various communication terminals, the base station reports transmission confirmation information to all of the communication terminals respectively. Therefore, for distinguishing these pieces of information with each other, user identification information (ID) is added to all of part 1 (ACK/NACK) of the uplink data transmission related information in the downlink L1/L2 control channel, so that each communication terminal can ascertain, without fail, transmission confirmation information (ACK/NACK) for the uplink data channel that was transmitted by the own terminal in the past.

However, in the present embodiment, from the viewpoint of decreasing the control information amount, transmission of the downlink L1/L2 control channel is performed without adding identification information to each piece of the information of part 1 of each communication terminal. Instead of that, correspondence relationship between the assignment number X used when mapping information of part 2 and information of part 1 is maintained for each communication terminal. For example, when a multiplexing method shown in FIG. 7F(1) is performed, assuming that assignment number 3 (X=3) is used for reporting information of part 2 to the communication terminal UE1 (third one in the multiplexing number N). In this case, by demodulating the resource information of the assignment number 3, a resource block of the uplink data channel is specified, so that the uplink data channel is transmitted by the resource block. The information (ACK/NACK) of the part 1 for the uplink data channel is described in the resource of assignment number 3 in the downlink L1/L2 control channel transmitted at t=TT1+α, in which α is time set for returning the transmission confirmation information. In step S3, such a L1/L2 control channel is transmitted to the communication terminal.

In step S4, each communication terminal reads information on part 1 based on the assignment number X and the predetermined period α to check whether it should retransmit data D(t=TTI1) that was transmitted at t=TTI1.

Accordingly, in the present embodiment, by maintaining one to one correspondence relationship between the assignment number that was used in step S1 and the assignment number used in step S3, the base station does not need to specify that the part (ACK/NACK) of the uplink data transmission related information is addressed to which communication terminal individually. Thus, according to the present method, information amount of the downlink L1/L2 control channel generated in step S22 in FIG. 9 can be decreased. Assuming that resources for uplink data channel are assigned to M communication terminals at a time of t=TTI1, the assignment number X is 1, . . . , M, and also, the number of assignment information (part 2) of the uplink data transmission related information, and the number of destinations to which transmission confirmation information (part 1) should be sent at a later time t=TTI+α are commonly M. Therefore, it is always possible to maintain the one to one correspondence relationship for the assignment number X.

Embodiment 8

Figure 10E:
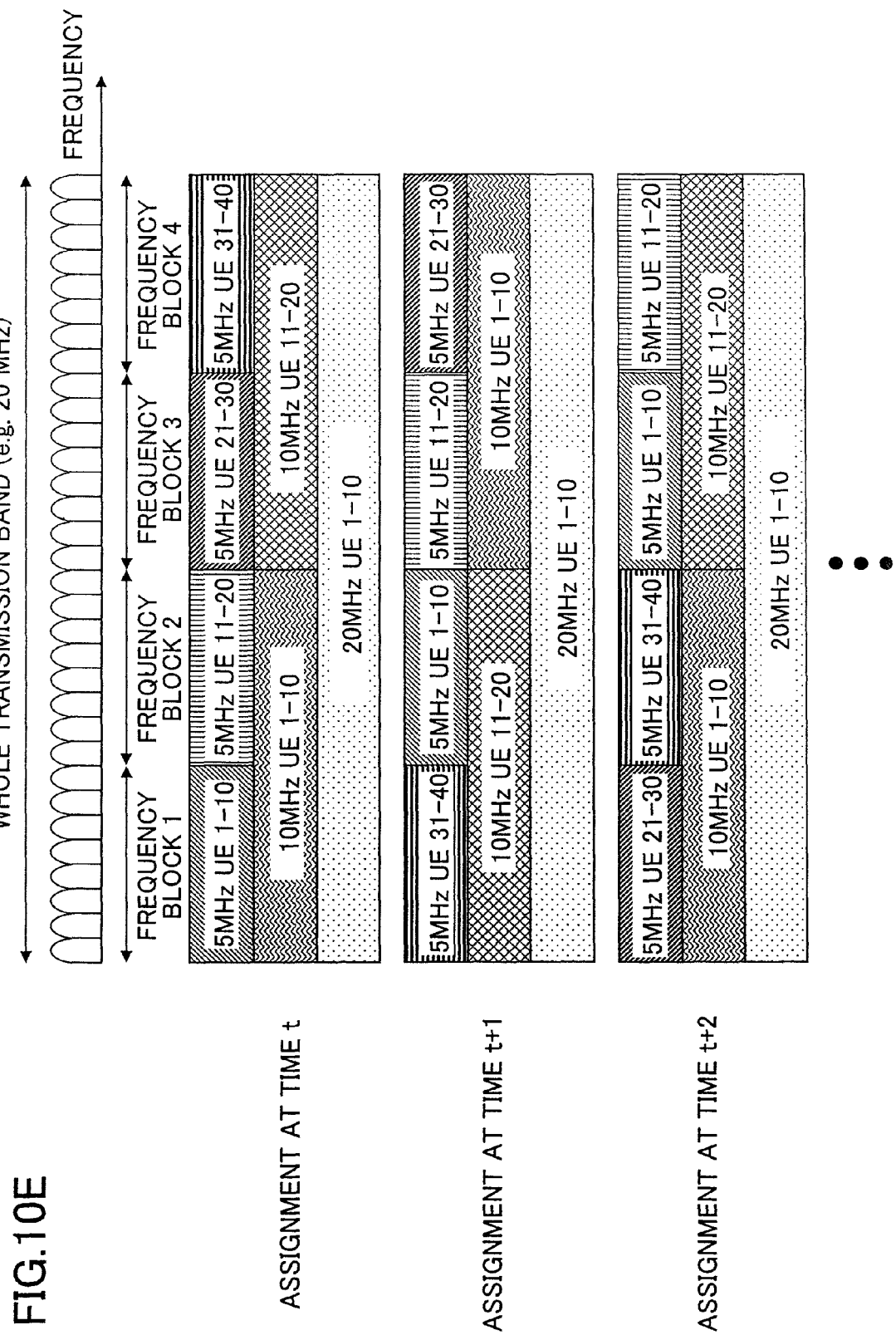
FIG. 10E is a diagram showing an operation example when frequency hopping is performed.

FIG. 10E is a figure showing an operation example when frequency hopping is performed. The frequency band assigned to the communication system is 20 MHz which includes four frequency blocks each having a minimum bandwidth of 5 MHz. In the example shown in the figure, the communication system can accommodate 40 users that can perform communication using a band of 5 MHz, 20 users that can perform communication using a band of 10 MHz, and 10 users that can perform communication using a band of 20 MHz.

The user that can perform communication using the band of 20 MHz can always use all of the frequency blocks 1-4. However, in the 40 users that can perform communication only with the band of 5 MHz, first to tenth users are permitted to use only frequency block 1 at a time t, permitted to use only frequency block 2 at a time t+1, and permitted to use only frequency block 3 at a time t+2. Eleventh to twentieth users are permitted to use frequency blocks 2, 3 and 4 at times t, t+1 and t+2 respectively. Twenty first to thirtieth users are permitted to use frequency blocks 3, 4 and 1 at times t, t+1 and t+2. Thirty first to fortieth users are permitted to use frequency blocks 4, 1 and 2 at times t, t+1 and t+2. In addition, in the 20 users that can perform communication only with the band of 10 MHz, first to tenth users are permitted to use only frequency blocks 1 and 2 at a time t, permitted to use only frequency blocks 3 and 4 at a time t+1, and permitted to use only frequency blocks 1 and 2 at a time t+2. Eleventh to twentieth users are permitted to use frequency blocks 3 and 4, 1 and 2, and 3 and 4 at times t, t+1 and t+2 respectively.

Such a frequency hopping pattern is reported to each user beforehand by a broadcast channel or other methods. In this case, some patters are defined beforehand as frequency hopping patterns, and a pattern number indicating which pattern is used in the patters is reported to a user, so that the frequency hopping pattern can be reported to the user with a small number of bits. When there are some choices in usable frequency blocks like the present embodiment, it is desirable to change usable frequency block after starting communication from the viewpoint of equalizing communication quality among users and among frequency blocks. For example, if the frequency hopping is not performed like the present embodiment, a particular user should always perform communication in bad quality when difference of superiority or inferiority of communication quality among frequency blocks is large. By performing frequency hopping, although communication quality is bad at a time, it can be expected that it becomes good at another time.

In the example shown in the figure, although a frequency hopping pattern in which frequency blocks of 5 MHz and 10 MHz shift to the right side one by one is shown, other various hopping patters may be used. This is because, even though any hopping pattern is adopted, it is only necessary that the pattern is known in the transmission side and the reception side.

Embodiment 9

In the ninth embodiment of the present invention described below, a method for transmitting a paging channel in addition to the control signaling channel is described.

Figure 11:
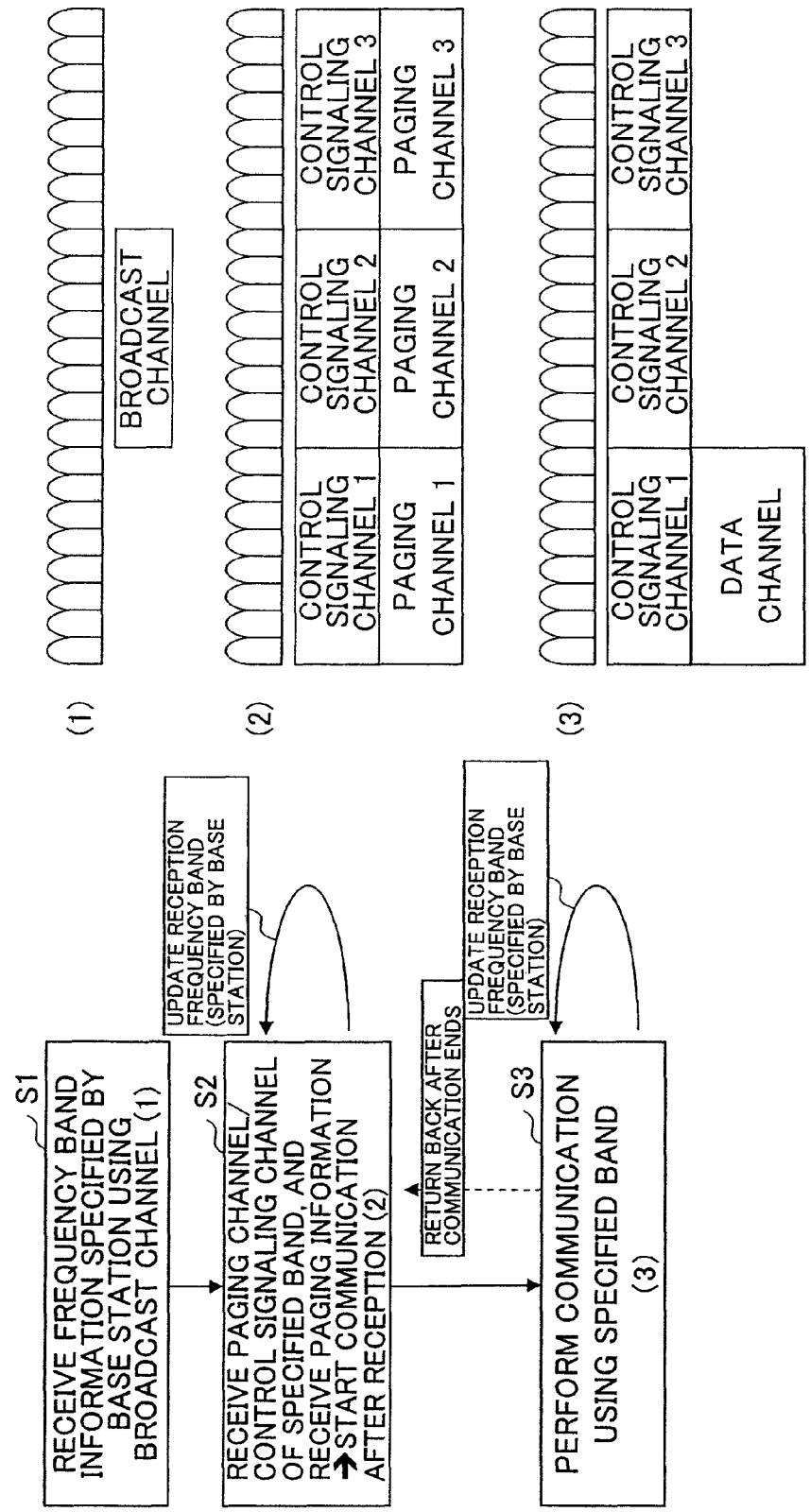
FIG. 11 is a diagram showing a flowchart of an operation example and frequency bands of an embodiment of the present invention.

FIG. 11 is a figure showing a flowchart (left side) of an operation example and frequency bands (right side) of an embodiment of the present invention. In step S1, a broadcast channel is transmitted from the base station to users under the base station. As shown in FIG. 11(1), the broadcast channel is transmitted using a minimum bandwidth including a center frequency of the whole frequency band. Broadcast information reported by the broadcast channel includes correspondence relationship between frequency bands that users can receive and usable frequency blocks.

In step S2, a user (UE1, for example) enters a waiting state for a specified frequency block (frequency block 1, for example). In this case, the user UE1 adjust the band of reception signal such that it can receive a signal of the frequency block 1 that is permitted to use. In the present embodiment, not only a control signaling channel for the user UE1 but also a paging channel for the user UE1 are transmitted using the frequency block 1. When it is checked that the user UE1 is paged by the paging channel, the flow goes to step S3.

In step S3, the data channel is received according to scheduling information using the specified frequency block. The user UE1 returns to the waiting state again after that.

Figure 12:
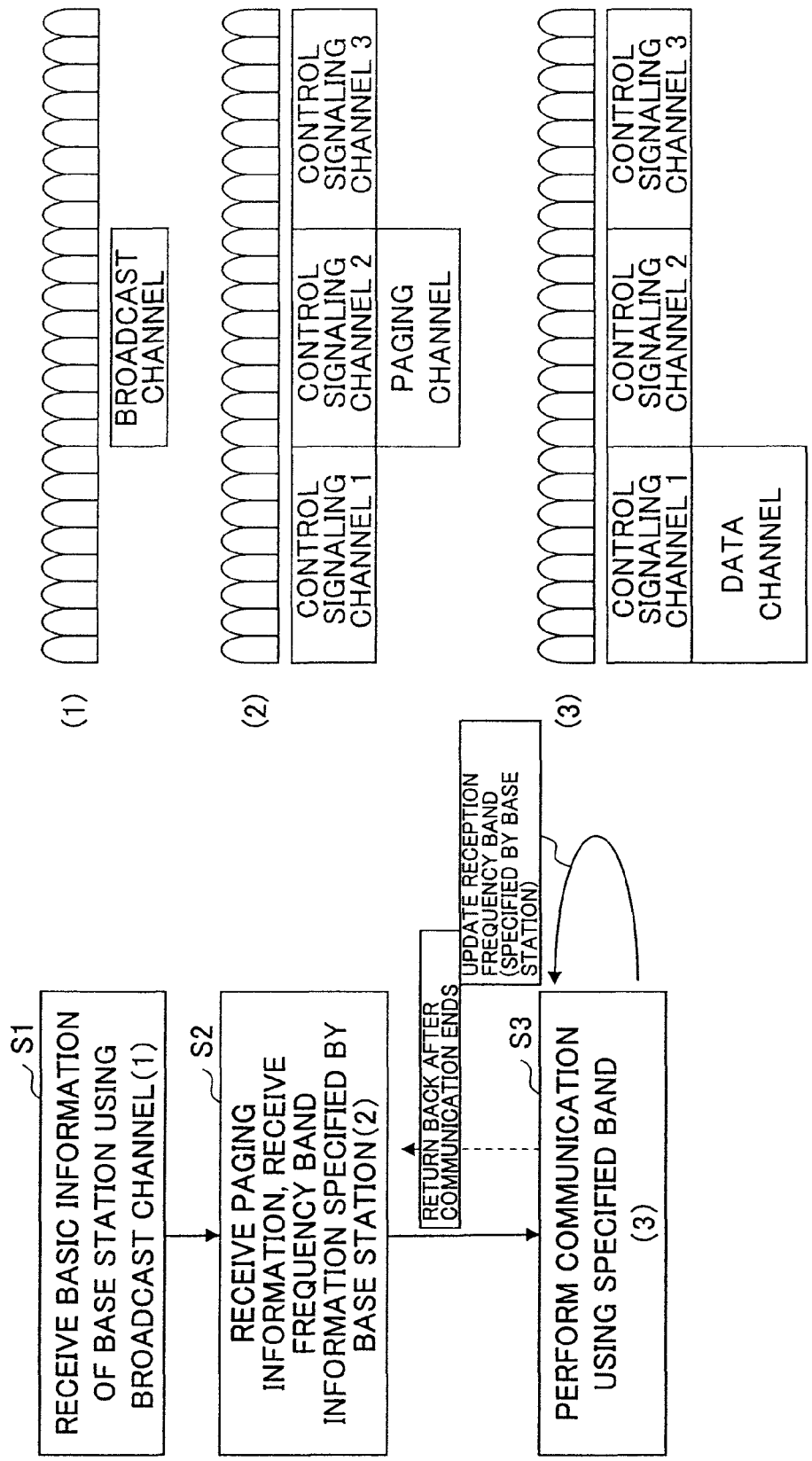
FIG. 12 is a diagram showing a flowchart of another operation example and frequency bands of an embodiment of the present invention.

FIG. 12 is a figure showing a flowchart (left side) of another operation example and frequency bands (right side) of an embodiment of the present invention. In step S1, like the above-mentioned example, a broadcast channel is transmitted from the base station to users under the base station, and the broadcast channel is transmitted using a minimum bandwidth including a center frequency of the whole frequency band (FIG. 12 (1)). Like the example of FIG. 11, it is assumed that the usable frequency block is the frequency block 1.

In step S2, the user UE1 enters a waiting state. Different from the above example, the user UE1 does not adjust the band of reception signal at this time. Therefore, the user UE1 waits for a paging channel using the band same as that for receiving the broadcast channel (FIG. 12 (2)).

In step S3, after the paging channel is identified, the terminal moves to the frequency block 1 that is assigned to the own station, and receives the control signaling channel to perform communication according to scheduling information (FIG. 12 (3)). The user UE1 returns to the waiting state again after that.

In the example shown in FIG. 11, the terminal quickly moves to the frequency block 1 at the time of waiting. But, in the example shown in FIG. 12, the terminal does not move at that time, but moves to the frequency block 1 after paging of the own terminal is identified. In the former method, each of various users waits for a signal using a frequency block assigned to each user. On the other hand, in the latter method, every user waits for a signal using a same band. Therefore, the former method may be preferable compared with the latter in that frequency resources can be used evenly. On the other hand, neighboring cell search for checking necessity of handover is performed using the minimum bandwidth of the center of the whole band. Thus, from the viewpoint of decreasing the number of times of frequency tuning in the terminal, it is desirable to match the band when used in waiting to the band for cell search like the example shown in FIG. 12.

Embodiment 10

Figure 13:
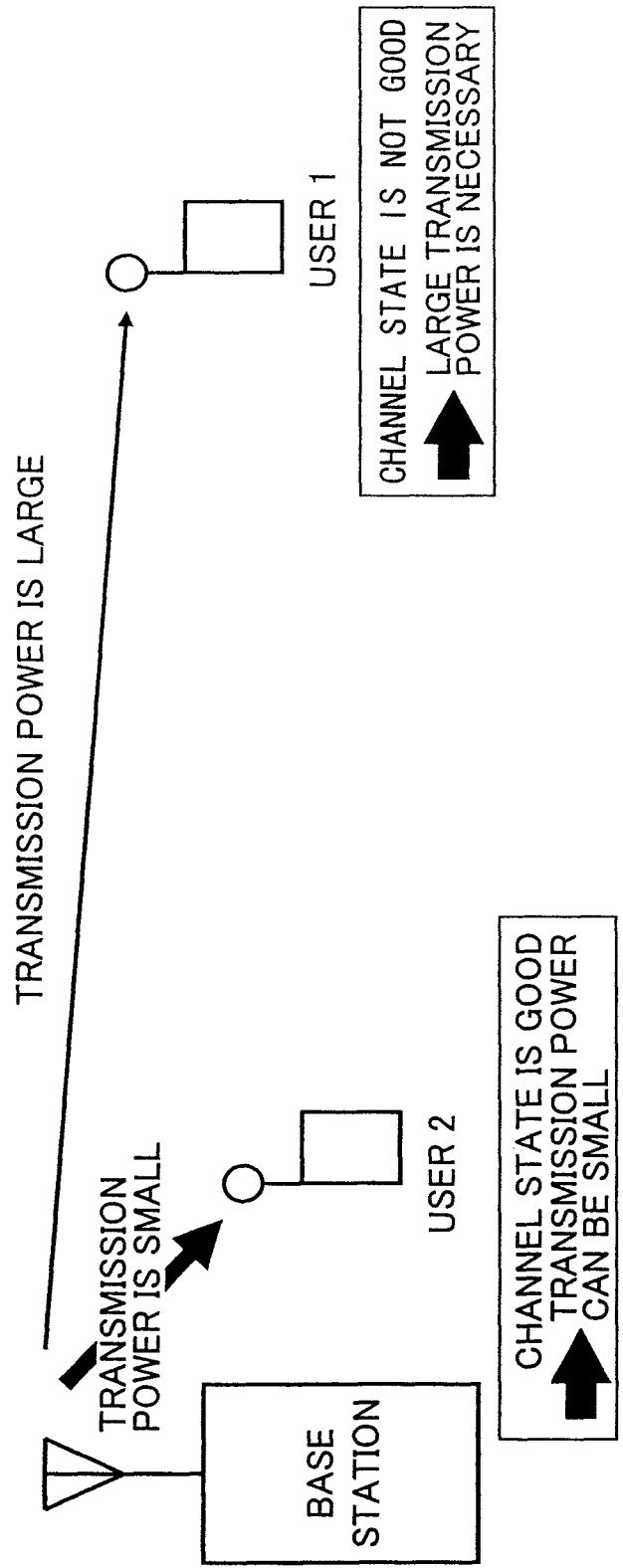
FIG. 13 is a diagram showing a manner in which TPC is performed.

By the way, it is desirable to perform link adaptation from the viewpoint of improving reception signal quality of the control channel. In the tenth embodiment of the present invention, as a method for performing link adaptation, transmission power control (TPC) and adaptive modulation and coding (AMC) control are used. FIG. 13 shows a manner in which transmission power control is performed, and it is intended to achieve required quality in the reception side by controlling transmission power of the downlink channel. More particularly, since it is predicted that channel state for a user 1 far from the base station is bad, the downlink channel is transmitted using a large transmission power. In contrast, it is predicted that channel state is good for a user 2 near the base station. In this case, if transmission power of the downlink channel to the user 2 is large, reception signal quality for the user 2 may be good, but interference becomes large for other users. Since channel state for the user 2 is good, required quality can be ensured even though transmission power is small. Therefore, in this case, the downlink channel is transmitted with a relatively small transmission power. When transmission power control is performed solely, the modulation scheme and the channel coding scheme are kept constant, and a combination known to the transmission side and the reception side is used. Therefore, it is not necessary to separately report a modulation scheme and the like for demodulating a channel in the transmission power control.

FIG. 14 shows a manner in which adaptive modulation and coding control is performed, and in which it is intended to achieve required quality in the reception side by adaptively changing both or one of the modulation scheme and the coding scheme according to good or bad of the channel state. More particularly, if transmission power from the base station is constant, since it is predicted that channel state of a user 1 far from the base station is bad, the number of modulation levels of multilevel modulation is set to be small and/or the channel coding rate is set to be small. In the example shown in the figure, QPSK is used as a modulation scheme for the user 1, and information of 2 bits are transmitted per 1 symbol. On the other hand, it is predicted that channel state for the user 2 located near the base station is good, so that the number of modulation levels is set to be large and/or the channel coding rate is set to be large. In the example shown in the figure, 16 QAM is used as a modulation scheme for the user 2, and information of 4 bits is transmitted per 1 symbol. Accordingly, required quality is achieved for a user in bad channel state by increasing reliability, and throughput can be improved while maintaining required quality for a user in a good channel state. In the adaptive modulation and coding control, when demodulating a received channel, information of a modulation scheme performed on the channel, coding scheme, number of symbols and the like is necessary. Thus, it is necessary that the information is reported to the reception side using some way. In addition, since the number of bits that can be transmitted per one symbol is different according to good or bad of the channel state, information can be transmitted with a small number of symbols when the channel state is good, but when it is not good, a large number of symbols are necessary.

In the tenth embodiment of the present invention, transmission power control is performed for a non-specific control channel that non-specific users should decode, and one or both of transmission power control and adaptive modulation and coding control is performed for a specific control channel that a specific user to which a resource block is assigned decodes. In particular, following three methods can be considered.

(1) TPC-TPC

In the first method, transmission power control is performed for the non-specific control channel, and also only transmission power control is performed for the specific control channel. Since modulation scheme and the like are fixed in transmission power control, when a channel is properly received, it can be demodulated without prior notification of modulation scheme and the like. Since the non-specific control channel is distributed over the whole frequency blocks, the non-specific control channel is transmitted using a same transmission power over the whole frequency range. On the other hand, a specific control channel for a user only occupies a specific resource block for the user. Therefore, transmission power of the specific control channel may be adjusted individually such that received signal quality becomes good for each user to which the resource block is assigned. For example, in the examples shown in FIGS. 7A and B, the non-specific control channel may be transmitted using transmission power $P_0$, a specific control channel of the user 1 (UE1) may be transmitted using transmission power $P_1$ suitable for the user 1, a specific control channel of the user 2 (UE2) may be transmitted using transmission power $P_2$ suitable for the user 2, and a specific control channel of the user 3 (UE3) may be transmitted using transmission power $P_3$ suitable for the user 3. By the way, the part of the shared data channel may be transmitted with a same or different transmission power $P_D$.

As mentioned above, the non-specific control channel should be decoded by all of the non-specific users. However, main purpose for transmitting the control channel is to report that there is data to be received and to report scheduling information and the like to a user to which a resource block is actually assigned. Therefore, transmission power when transmitting the non-specific control channel may be adjusted such that required quality is satisfied for the user to which the resource block is assigned. For example, in the examples shown in FIGS. 7A and B, when all of the users 1, 2 and 3 are located near the base station, transmission power $P_0$ of the non-specific control channel may be set to be relatively small. In this case, users other than the users 1, 2 and 3 located at an end of the cell, for example, may not be able to decode the non-specific control channel properly. But, since the users are not assigned a resource block, there is no actual harm.

(2) TPC-AMC

In the second method, transmission power control is performed for the non-specific control channel, and only adaptive modulation and coding control is performed for the specific control channel. When the AMC control is performed, generally, it is necessary that the modulation scheme and the like are reported beforehand. In the present method, information such as the modulation scheme and the like for the specific control channel is included in the non-specific control channel. Therefore, each user receives the non-specific control channel first, decodes and demodulates it to determine presence or absence of data addressed to the own station. If the data exists, in addition to extracting scheduling information, the user extracts information on the modulation scheme, coding scheme and the number of symbols and the like that are applied to the specific control channel. Then, the specific control channel is demodulated according to the scheduling information and information of the modulation scheme and the like, information of the modulation scheme and the like for the shared data channel is obtained, so that the shared data channel is demodulated.

It is not so required to transmit the control channel with high throughput compared with the shared data channel. Therefore, when AMC control is performed for the non-specific control channel, the total number of combinations of modulation schemes and the like can be less than the total number of modulation schemes and the like for the shared data channel. For example, as a combination of AMC for the non-specific control channel, the modulation scheme may be fixed to QPSK, and the coding rate may be changed like ⅞, ¾, ½ and ¼.

According to the second method, quality of the specific control channel can be made good while maintaining quality of the non-specific control channel to be equal to or greater than a predetermined level over the whole users. This is because the specific control channel is mapped to a resource block in a good channel state for each of specific communication terminals, and proper modulation scheme and/or coding scheme is used. In the control channel, by performing adaptive modulation and coding control on a part of the specific control channel, reception quality of the part can be improved.

By the way, the number of combinations of modulation schemes and channel coding rates may be limited to very small, so that demodulation may be tried for every combination in the reception side. Content by which demodulation can be performed well is adopted finally. Accordingly, even though information on modulation scheme and the like is not reported beforehand, AMC control can be performed to some extent.

(3) TPC-TPC/AMC

In the third method, transmission power control is performed for the non-specific control channel, and both of transmission power control and adaptive modulation and coding control are performed for the specific control channel. As mentioned above, when AMC control is performed, it is necessary that modulation scheme and the like is reported beforehand as a general rule. In addition, it is desirable that the total number of combinations of modulation schemes and channel coding rates is large from the viewpoint of maintaining required quality even when there is largely changing fading. However, when the total number is large, determining processes for the modulation scheme and the like become complicated, and the amount of information necessary for notification becomes large so that calculation load and overhead become large. In the third method, transmission power control is used in addition to the AMC control so that required quality is maintained by both controls. Therefore, it is not necessary to compensate for all of the largely changing fading only by AMC control. In particular, modulation scheme and the like that reaches the vicinity of required quality is selected, so that required quality can be maintained by adjusting transmission power under the selected modulation scheme and the like. Therefore, the total number of combinations of the modulation schemes and the channel coding schemes may be limited to small.

In any of the above methods, since only transmission power control is performed for the non-specific control channel, the user can easily obtain control information while required quality is maintained. Different from AMC control, since information transmission amount per one symbol is unchanging, transmission can be performed easily using a fixed format. Since the non-specific control channel is distributed over the whole region of the frequency blocks or over many resource blocks, frequency diversity effect is large. Therefore, it can be expected that required quality is sufficiently achieved by simple transmission power control such as one in which long periodic average level is adjusted. By the way, it is not essential for the present invention that only transmission power control is performed for the non-specific control channel. For example, the transmission format used for the non-specific control channel may be controlled in a low speed using a broadcast channel.

By including AMC control information (information for specifying the modulation scheme and the like) for the specific control channel in the non-specific control channel, AMC control can be performed for the specific control channel. Thus, transmission efficiency and quality can be improved for the specific control channel. Although the number of symbols necessary for the non-specific control channel is almost constant, the number of symbols necessary for the specific control channel is different according to content of AMC control and the number of antennas and the like. For example, assuming that the number of necessary symbols is N when the channel coding rate is ½ and the number of antenna is 1, the number of necessary symbols increases to 4N when the channel coding rate is ¼ and the number of antennas is 2. Accordingly, even though the number of necessary symbols for the control channel changes, the control channel can be transmitted by a simple fixed format as shown in FIGS. 7A and B in the present embodiment. Content of change of the number of symbols is not included in the non-specific control channel, and it is included only in the specific control channel. Therefore, by changing occupation ratio of the specific control channel and the shared data channel in a specific resource block, such a change of the number of symbols can be flexible dealt with.

As mentioned above, although preferred embodiments of the present invention are described, the present invention is not limited to those, and various variations and modifications may be made without departing from the scope of the present invention. For the sake of explanation, although the present invention is described by being divided to some embodiments, the division to each embodiment is not essential for the present invention, and equal to or greater than two embodiments may be used as necessary.

The present international application claims priority based on Japanese patent application No. 2006-10496, filed in the JPO on Jan. 18, 2006 and the entire contents of the Japanese patent application is incorporated herein by reference.

The present international application claims priority based on Japanese patent application No. 2006-127987, filed in the JPO on May 1, 2006 and the entire contents of the Japanese patent application is incorporated herein by reference.

The present international application claims priority based on Japanese patent application No. 2006-272347, filed in the JPO on Oct. 3, 2006 and the entire contents of the Japanese patent application is incorporated herein by reference.

The present international application claims priority based on Japanese patent application No. 2006-298312, filed in the JPO on Nov. 1, 2006 and the entire contents of the Japanese patent application is incorporated herein by reference.

The invention claimed is:

1. A transmission apparatus comprising:
a frequency scheduling unit configured to assign at least one resource block to individual communication terminals, wherein a frequency band provided to a communication system includes a plurality of frequency blocks each of which includes a plurality of resource blocks; and
a first generation unit configured to generate a data channel for a communication terminal to which at least one resource block is assigned in the frequency scheduling unit;
a second generation unit configured to generate a specified control channel for a communication terminal, on a terminal-by-terminal basis, to which at least one resource block is assigned in the frequency scheduling unit;
a third generation unit configured to generate an unspecified control channel common to communication terminals to which at least one resource block is assigned in the frequency scheduling unit;

a fourth generation unit configured to generate a broadcast channel including broadcast information to be reported to a communication terminal;

a multiplexing unit configured to arrange the broadcast channel generated in the fourth generation unit on a frequency block which includes a center frequency among the plurality of frequency blocks included in the frequency band provided to the communication system, and arrange the unspecified control channel generated in the third generation unit, at least one specified control channel generated in the second generation unit and at least one data channel generated in the first generation unit over the plurality of frequency blocks included in the frequency band provided to the communication system: and a transmission unit configured to transmit an output signal of the multiplexing unit, wherein the number of symbols in a part which includes at least one specified control channel generated in the second generation unit is variable, and the unspecified control channel generated in the third generation unit includes information related to the number of symbols in a part which includes at least one specified control channel generated in the second generation unit.

2. The transmission apparatus as claimed in claim 1, wherein the specified control channel generated in the second generation unit includes information related to a data modulation scheme.

3. The transmission apparatus as claimed in claim 1, wherein the specified control channel generated in the second generation unit includes information related to a coding scheme.

4. The transmission apparatus as claimed in claim 1, wherein the specified control channel generated in the second generation unit includes information related to hybrid retransmission control.

5. The transmission apparatus as claimed in claim 1, wherein the specified control channel generated in the second generation unit includes precoding information for use in a MIMO scheme.

6. The transmission apparatus as claimed in claim 1, wherein the multiplexing unit time multiplexes at least one data channel generated in the first generation unit onto the unspecified control channel generated in the third generation unit and at least one specified control channel generated in the second generation unit.

7. The transmission apparatus as claimed in claim 1, wherein the multiplexing unit arranges a paging channel in a similar way to the data channel.

8. A transmission method comprising the steps of:

assigning at least one resource block to individual communication terminals, wherein a frequency band provided to a communication system includes a plurality of frequency blocks each of which includes a plurality of resource blocks; and generating a data channel for a communication terminal to which at least one resource block is assigned;

generating a specified control channel for a communication terminal, on a terminal-by-terminal basis, to which at least one resource block is assigned;

generating an unspecified control channel common to communication terminals to which at least one resource block is assigned;

generating a broadcast channel including broadcast information to be reported to a communication terminal;

arranging the broadcast channel on a frequency block which includes a center frequency among the plurality of frequency blocks included in the frequency band provided to the communication system, and arranging the unspecified control channel, at least one specified control channel and at least one data channel over the plurality of frequency blocks included in the frequency band provided to the communication system; and transmitting an output signal from the step of arranging, wherein the number of symbols in a part which includes at least one specified control channel generated in the step of generating the specified control channel is variable, and the unspecified control channel generated in the step of generating the unspecified control channel includes information related to the number of symbols in a part which includes at least one specified control channel generated in the step of generating the specified control channel.

9. The transmission method as claimed in claim 8, wherein the specified control channel generated in the step of generating the specified control channel includes information related to a data modulation scheme.

10. The transmission method as claimed in claim 8, wherein the specified control channel generated in the step of generating the specified control channel includes information related to a coding scheme.

11. The transmission method as claimed in claim 8, wherein the specified control channel generated in the step of generating the specified control channel includes information related to hybrid retransmission control.

12. The transmission method as claimed in claim 8, wherein the specified control channel generated in the step of generating the specified control channel includes precoding information for use in a MIMO scheme.

13. The transmission method as claimed in claim 8, wherein, in the step of arranging, at least one data channel is time-multiplexed onto the unspecified control channel and at least one specified control channel.

14. The transmission method as claimed in claim 8, wherein, in the step of arranging, a paging channel is arranged in a similar way to the data channel.

* * * * *